US010891341B2

(12) United States Patent
Brown et al.

(10) Patent No.: US 10,891,341 B2
(45) Date of Patent: Jan. 12, 2021

(54) SEARCHING OF REAL-TIME INTERNET CONTENT RESPONSIVE TO A STRUCTURED SEARCH QUERY GENERATED BASED ON USER-SPECIFIED SEARCH TERMS/PHRASES AND PRIVATE DATABASE RECORDS MATCHING INITIAL USER-SELECTED CONSTRAINTS

(71) Applicant: Onemata Corporation, Denver, CO (US)

(72) Inventors: Bradley D. Brown, Denver, CO (US); Michael G. George, Jr., Centennial, CO (US); William M. Smith, Denver, CO (US); Michael G. Higgins, Thorton, CO (US); Brittney Dougherty, Denver, CO (US); Allison Heimlich, Denver, CO (US)

(73) Assignee: Onemata Corporation, Denver, CO (US)

( * ) Notice: Subject to any disclaimer, the term of this patent is extended or adjusted under 35 U.S.C. 154(b) by 77 days.

(21) Appl. No.: 16/373,125

(22) Filed: Apr. 2, 2019

(65) Prior Publication Data

US 2020/0320150 A1 Oct. 8, 2020

(51) Int. Cl.
*G06F 16/9532* (2019.01)
*G06F 16/957* (2019.01)
(Continued)

(52) U.S. Cl.
CPC .... *G06F 16/9532* (2019.01); *G06F 16/24522* (2019.01); *G06F 16/24549* (2019.01); *G06F 16/24565* (2019.01); *G06F 16/9574* (2019.01)

(58) Field of Classification Search
CPC ............ G06F 16/9532; G06F 16/9574; G06F 16/24549; G06F 16/24522; G06F 16/24565
(Continued)

(56) References Cited

U.S. PATENT DOCUMENTS

2003/0046311 A1* 3/2003 Baidya .................. G06F 16/954
2009/0204569 A1* 8/2009 Bowden ................ G06F 16/951
(Continued)

OTHER PUBLICATIONS

Nigam, A., "Web Crawling Algorithms." International Journal of Computer Science and Artificial Intelligence. Sep. 2014, vol. 4 Iss. 3, pp. 63-67.
(Continued)

*Primary Examiner* — Alicia M Antoine
(74) *Attorney, Agent, or Firm* — Jaffery Watson Mendonsa & Hamilton LLP

(57) ABSTRACT

Systems and methods for an improved Internet search engine are provided. According to one embodiment, a search request is received from an end user via a browser based interface. The search request includes (i) initial constraint(s) to be used by the Internet search engine to constrain a search of real-time Internet content and (ii) user-specified search terms. A structured search query is generated based on company records of a company database matching the initial constraint(s). The search of real-time Internet content is performed and search results are returned by, for each web site domain specified in the structured search query, applying the search term(s) to a predetermined number of web pages for the domain. The search results, including a list of companies associated with the search results, is locally stored and presented to the end user. Interactive filtering and/or ranking of the locally stored search results is then facilitated.

24 Claims, 16 Drawing Sheets

(51) Int. Cl.
*G06F 16/2452* (2019.01)
*G06F 16/2453* (2019.01)
*G06F 16/2455* (2019.01)

(58) Field of Classification Search
USPC .......................................................... 707/760
See application file for complete search history.

(56) References Cited

U.S. PATENT DOCUMENTS

2012/0265610 A1* 10/2012 Shama .................. G06F 16/313
705/14.49
2013/0117370 A1* 5/2013 Liu ......................... H04L 67/02
709/204

OTHER PUBLICATIONS

Internet Archive: Search Engine. https://archive.org/advancedsearch.php. 5 pgs.

* cited by examiner

SEARCHING OF REAL-TIME INTERNET CONTENT RESPONSIVE TO A STRUCTURED SEARCH QUERY GENERATED BASED ON USER-SPECIFIED SEARCH TERMS/PHRASES AND PRIVATE DATABASE RECORDS MATCHING INITIAL USER-SELECTED CONSTRAINTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Onemata Corporation.

BACKGROUND

Field

Embodiments of the present invention generally relate to Internet search technologies. In particular, embodiments of the present invention relate to retrieval of real-time Internet content responsive to a structured search query generated based on private database records matching one or more initial user-selected constraints (e.g., characteristics or attributes of companies of interest) and one or more user-specified search terms/phrases and enabling local filtering and ranking of the retrieved real-time results based on refinements to the user-specified search terms/phrases and user-specified scoring of the search terms/phrases, respectively.

Description of the Related Art

The Internet is defined as the worldwide interconnection of individual networks operated by government, industry, academia, and private parties. As of December 2018, there were approximately 1.94 billion websites in the world. The sheer number of websites and the constant evolution and changes to these websites over time makes it impractical to provide reasonably prompt search results of real-time (i.e., live) Internet content.

A survey by Netcraft in 2012 showed that the total number of websites launched in 2012 were 51 million—representing an average of approximately 140,000 websites being launched per day. Because real-time Internet content is being added at such a significant pace, search results provided by traditional Internet search engines (e.g., Google, Bing, Yahoo, Ask.com and the like), which rely on periodic crawling to discover new and updated pages to be added to their local indices, are necessarily stale as they have traded off the speed of providing search results against the freshness and accuracy of the results. For example, it may take four weeks or longer for a new website to be indexed by Google and stored in its local database.

Other limitations of traditional Internet search engines include search bias and the unstructured nature of their free-form search queries, which are restricted to text entered into a search text field. With respect to search bias, traditional search engines rank websites at least in part based on the concept of intrinsic authority (i.e., a website's purported relevance to a specific subject area or industry based on automated analytic algorithms), which in many cases is flawed and allows rankings to be manipulated by keyword stuffing, for example. Furthermore, rankings of search results are affected by the search engine companies' commercial interests, including their dependence on paid advertising, keyword bidding, and the promotion of their own products. Turning now to the unstructured textual input provided to traditional search engines, this denies the search engine context that might be helpful to provide meaningful and relevant search results to the end user.

In view of the foregoing, there is a need in the art for improved Internet search technology that, among other things, provides results that are fresh at the time the search is performed, constrains search processing of real-time Internet content to enable reasonable search times by injecting context into the search process by way of structured search queries, and allows interactive filtering and ranking of the search results by end users, thereby providing end users with more relevant and actionable results.

SUMMARY

Systems and methods are described for an improved Internet search engine. According to one embodiment, a search request from an end user of a subscriber of a Software as a Service (SaaS) based Internet search engine is received by one or more processors of one or more physical or virtual servers of the SaaS based Internet search engine via a browser based interface displayed on a client device being used by the end user. The search request includes (i) one or more initial constraints to be used by the SaaS based Internet search engine to constrain a search of real-time Internet content to be performed responsive to the search request and (ii) one or more user-specified search terms or phrases. A structured search query is generated by (a) identifying company records matching the one or more initial constraints by searching a company database having stored therein characteristics/attributes regarding multiple companies; and (b) incorporating into the structured search query: (1) multiple domain names each representing a web site domain of a company of those of the multiple companies associated with the identified matching records by extracting the multiple domain names from the identified matching company records; and (2) the one or more user-specified search terms or phrases. The search of real-time Internet content is performed based on the structured search query by, for each domain name of the domain names: (i) retrieving a predetermined number of web pages associated with the web site domain; and (ii) when content of the predetermined number of web pages satisfies match criteria associated with one or more user-specified search terms or phrases, adding the content to a set of search results. Information regarding the set of search results, including a list of companies associated with the set of search results, is locally stored by the SaaS based Internet search engine and presented to the end user via the browser based interface. One or more of interactive filtering and interactive ranking of the locally stored set of search results is then facilitated based on one or more user-selected desired characteristics of companies in the list of companies or one or more user-selected desired characteristics of the content of the companies.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 8E illustrates a portion of prospect list screen of a user interface of a SaaS based Internet search engine in accordance with an embodiment of the present invention.

FIG. 8F illustrates a portion of search result filtering screen of a user interface of a SaaS based Internet search engine in accordance with an embodiment of the present invention.

FIG. 8G illustrates a portion of search result ranking screen of a user interface of a SaaS based Internet search engine in accordance with an embodiment of the present invention.

DETAILED DESCRIPTION

Figure 1:
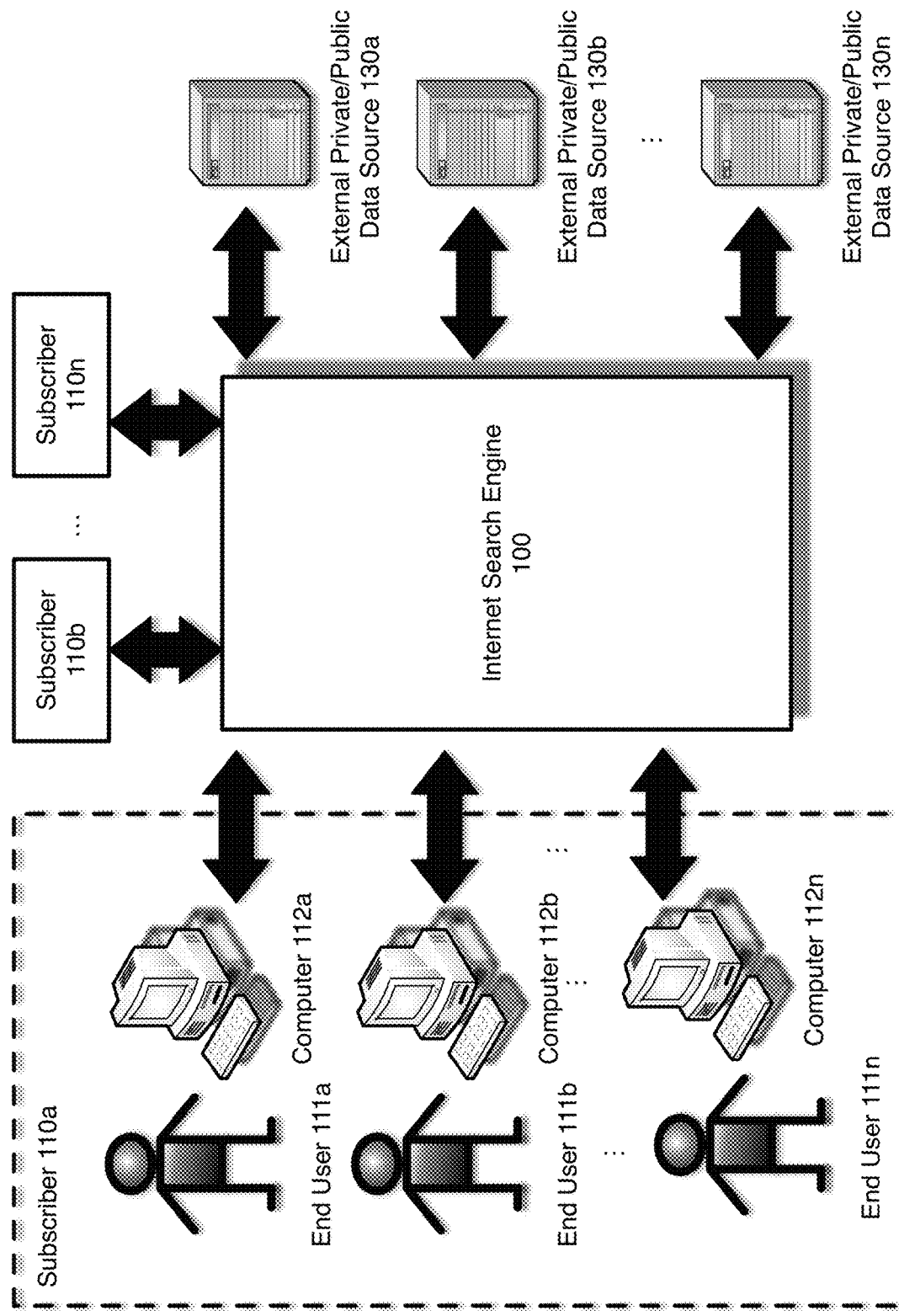
FIG. 1 is a context level diagram illustrating external interactions with/by a SaaS based Internet search engine in accordance with an embodiment of the present invention.

Systems and methods are described for an improved Internet search engine. In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, depending upon the particular implementation, various steps may be performed by a combination of hardware, software, firmware and/or by human operators.

Embodiments of the present invention may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present invention with appropriate special purpose or standard computer hardware to execute the code contained therein. An apparatus for practicing various embodiments of the present invention may involve one or more computers (e.g., physical and/or virtual servers) (or one or more processors within a single computer) and storage systems containing or having network access to computer program(s) coded in accordance with various methods described herein, and the method steps associated with embodiments of the present invention may be accomplished by modules, routines, subroutines, or subparts of a computer program product.

While embodiments of the present invention are described herein with reference to a particular practical application involving performing searching of real-time Internet content to identify motivated prospects based on an Ideal Customer Profile (ICP) defined by an end user, embodiments of the present invention are applicable to searching of real-time and/or archived Internet content more generally. An end user or subscriber may wish to identify companies or products/services offered by such companies for purposes other than or in addition to customer prospecting, including, for example, for purposes of facilitating one or more of industry research, government administration, identifying potential merger and/or acquisition opportunities, recruiting/staffing, procurement, licensing, partnering, joint development, joint research, collaboration, and/or otherwise obtaining actionable business intelligence.

Terminology

Brief definitions of terms used throughout this application are given below.

The phrase "cloud service" refers to any service made available to users on demand via the Internet from physical or virtual servers of a cloud computing service provider as opposed to being provided from on-premises servers of an enterprise. Cloud services are designed to provide easy, scalable access to virtual hardware (e.g., Linux virtual machines, Windows virtual machines, blob storage, file storage, managed disks), software, infrastructure, applications (e.g., Single Sign-On, databases, developer tools) and other services and resources, and are fully managed by the cloud services provider. Non-limiting examples of cloud service providers and their respective cloud computing platforms include Amazon (Amazon Web Services), Kamatera (Kamatera cloud computing infrastructure), Microsoft Corporation (Microsoft Azure), Google (Google Cloud Platform), VMware (VMware Cloud), IBM (IBM cloud), Oracle (Oracle Cloud), Red Hat (Red Hat Cloud) and Rackspace (Rackspace Cloud).

The term "subscriber" generally refers to an entity or person that subscribes to Internet search services provided by an Internet search engine or Internet search provider.

The term "user" and the phrase "end user" generally refer to a person associated with a subscriber and having a user account with the Internet search engine or Internet search provider. Notably, a subscriber and an end user may effectively be one in the same for a subscribing entity having a single user. As such, "subscriber," "user," and "end user" may be used interchangeably herein. In other cases, depending upon the context, "subscriber" may refer to an entity having multiple end users.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

FIG. 1 is a context level diagram illustrating external interactions with/by a SaaS based Internet search engine 100 in accordance with an embodiment of the present invention.

As described further below, in one embodiment, Internet search engine 100 may be implemented in the form of a powerful customer prospecting tool that facilitates the identification of motivated prospective customers by subscribers 110a-n. In the context of the present example, Internet search engine 100 may operate in accordance with a SaaS software distribution model in which a third-party (an Internet search service provider or SaaS provider) hosts an application and associated data that facilitates searching of real-time Internet content by subscribers 110a-n. Subscribers 110a-n may represent corporate entities including a number of end users 111a-n that interact with Internet search engine 100 via the Internet (not shown) or may represent individual end users. As explained below, Internet search engine 100 may make use of data contained in one or more external private or public data sources 130a-n to constrain the domain name space of real-time Internet content searched responsive to search queries issued by the end users of subscribers 110a-n so as to make practical the delivery of both fresh and accurate search results in a reasonable amount of time.

The private data sources may include, but are not limited to, databases of company information (company databases), potentially a separate database for each language supported by Internet search engine 100, proprietary databases (e.g., a subscriber's list of companies or prospects and/or Customer Relationship Management (CRM) data, social media data, commercially available customer prospecting databases, and the like), and government or compiled data. Internet search engine 100 may retrieve data from external private/public data sources 130a-n by issuing queries via web services and/or web application programming interfaces (APIs) provided by the owners/hosts of such data sources. As one non-limiting example, the web APIs may be implemented in the form of Representational State Transfer (REST)ful APIs.

Figure 2:
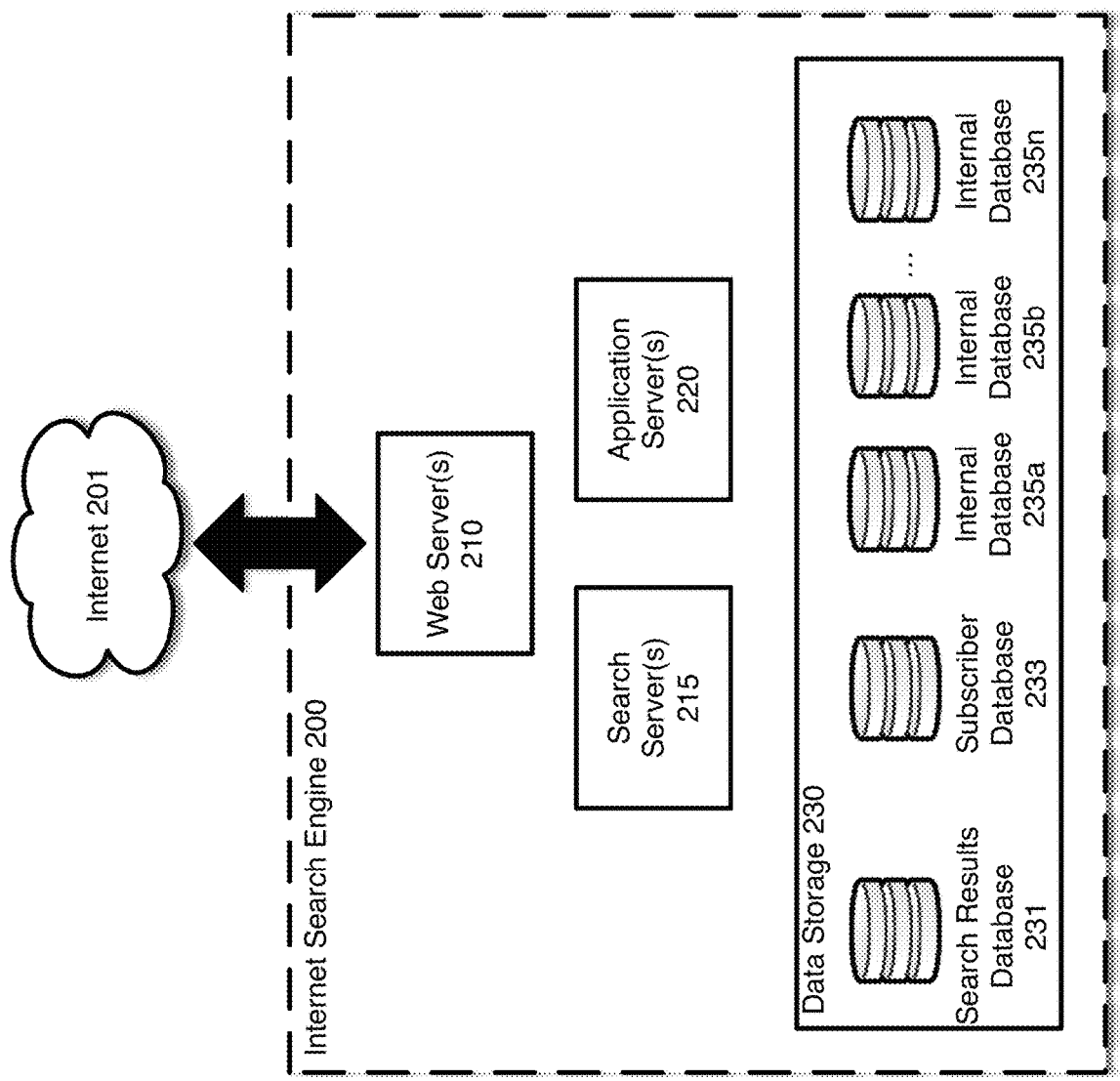
FIG. 2 is a system level diagram conceptually illustrating an architecture of a SaaS based Internet search engine in accordance with an embodiment of the present invention.

FIG. 2 is a system level diagram conceptually illustrating an architecture of a SaaS based Internet search engine 200 in accordance with an embodiment of the present invention. In the present example, subscribers (e.g., subscribes 110a-n) are provided with Internet content search services by Internet search engine 200 via the Internet 201. According to the intentionally simplified and conceptual illustration provided by FIG. 2, Internet search engine 200 includes one or more web servers 210, one or more search servers 215, one or more application servers 220 and data storage 230. As embodiments of the present disclosure are focused primarily on user interface enhancements and other methodologies (e.g., query generation and Internet content processing) that seek to improve Internet searching to facilitate practical searching of real-time Internet content, for sake of brevity an exemplary architecture that may be utilized by the SaaS provider for hosting the application and data centrally is provided simply for context and is described at a high level.

Web server(s) 210 provide HyperText Transfer Protocol (HTTP) protocol level service and serve as an interface between an end user's browser and Internet search engine 200. As those skilled in the art appreciate, web servers work with HTTP requests, responding and handling them in order to carry out website functions, as well as hosting the website, storing its static content, such as images, JavaScript, Cascading Style Sheet (CSS), and HyperText Markup Language (HTML) pages.

Application servers 220 provide web server support and handle all application operations between end users and backend applications or databases (e.g., search results database 231, subscriber database 233, and internal databases 235*a-n*) within data storage 230. For example, application servers 220 may be responsible for generating dynamic content for presentation to end users via their browsers. Application servers may also handle other functions, such as user authentication in accordance with policies established by the subscribers and the Internet search service provider. For purposes of supporting scalability and multitenancy, while a common version of the application providing for searching of real-time Internet content may be used by all subscribers, the application may be installed on multiple machines or machine instances.

Search servers 215 are responsible for performing Internet search processing as described in further detail below, including, but not limited to, executing structured search queries generated by application servers 220 responsive to search requests initiated by end users.

In the current example, data storage 230 is shown including a search results database 231, a subscriber database 233, and multiple internal databases 235*a-n*. Search results database 231 may provide storage for search results returned by search servers 215 in response to search requests made by end users. For example, search results database 231 may store search results (e.g., a list of companies and associated Internet content) and various sub-datasets of search results provided by search servers 215 on behalf of subscribers. Subscriber database 233 may store subscriber-specific data, including, among other things, user names of end users and corresponding login credentials and access rights, for each subscriber. Internal databases 235*a-n* may represent local cached versions or subsets of various external private/public data sources (e.g., external private/public data source 130*a-n*). One or more of internal databases 235*a-n* may also represent a private company database generated by SaaS provider based on one or more of purchased data and/or mined Internet data. Those skilled in the art will appreciate a greater or lesser number of databases may be used depending upon the particular implementation and desired distribution/isolation of data.

According to one embodiment, the architecture depicted in FIG. 2 may be implemented entirely within a local or on-premises server farm controlled by the SaaS provider or entirely within a third-party cloud service. Alternatively, a hybrid architecture may be employed in which one or more portions of the architecture depicted in FIG. 2 are distributed among the local or on-premises server farm and one or more third-party cloud services. In such a hybrid architecture, requests from subscribers can be handled locally until a predetermined or configurable resource usage threshold is reached with overflow in excess of the resource usage threshold being offloaded to the one or more cloud services.

Figure 3:
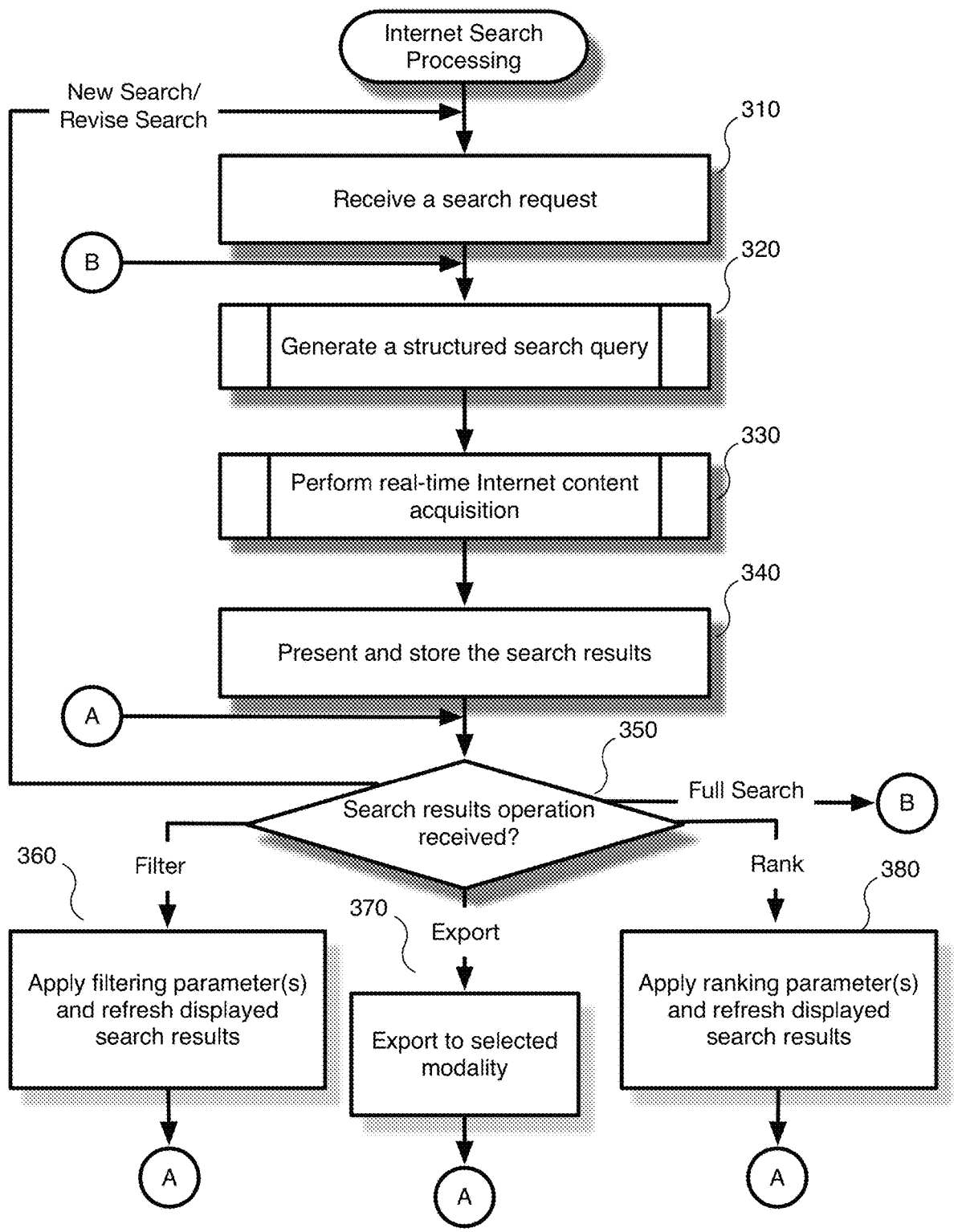
FIG. 3 is a high-level flow diagram illustrating search processing in accordance with an embodiment of the present disclosure.

FIG. 3 is a high-level flow diagram illustrating search processing in accordance with an embodiment of the present disclosure. In the context of the present example, search processing is initiated responsive to receipt of a search request at block 310. As described further below, the search request may be derived from input provided by an end user of an Internet search engine (e.g., Internet search engine 100) via a browser-based user interface. In one embodiment, the search request specifies one or more initial constraints and one or more search terms and/or phrases. Among other things, the one or more initial constraints limit the scope of Internet content that is to be searched, thereby making the performance of a search of real-time Internet content feasible within a reasonable amount of time. The one or more search terms and/or phrases may include individual terms or multiple terms (phrases) that must be present, must not be present and/or are preferably present within Internet content in order for the Internet content to be considered a match in the context of the search query.

At block 320, a structured search query is generated. The structured search query may represent a query that is to be performed in whole or in part by one or more downstream processing resources (e.g., one or more physical or virtual servers specifically allocated to meet the processing requirements associated with the structured search query). In one embodiment, the structured search query includes a list of domain names of websites that are to be searched for the one or more search terms and/or phrases and is generated based on the search request received at block 310 and one or more private data sources. As described further below, since even the performance of a constrained real-time Internet content search is a time consuming process that may take from a few hours to several hours depending upon various factors including computing resources allocated to or otherwise applied to the search, the number of websites and the number of webpages within the websites being scanned, in one embodiment, a configurable or predetermined parameter (e.g., selectable by the end user via the browser-based interface or a default parameter for all new searches) may intentionally limit a structured search query generated responsive to an initial search request (or until the end user specifies otherwise) to a relatively small sample set of websites meeting a sampling criterion (e.g., those associated with 100, 200 or 500 domain names, those associated with companies in a particular geographic area (state, city, or postal code (e.g., a ZIP code) or those associated with companies within a predetermined or configurable radius of a particular location (e.g., address, postal code, or coordinates). In this manner, the end user can be provided with prompt feedback (on the order of a few to several minutes) regarding a subset of potential outcomes of their search request and be provided with an opportunity to revise it accordingly rather than submitting a search request that is potentially overly inclusive and having to wait several hours to find out the search request is not consistent with the end user's intent. A non-limiting example of structured search query generation processing is described further below with reference to FIG. 4.

At block 330, real-time Internet content acquisition is performed based on and responsive to the structured search query generated at block 320. As those skilled in the art will appreciate, there are a number of ways to distribute the workload associated with performing real-time Internet acquisition. For example, the unit of work to be allocated to available processing resources may be at the domain, sub-domain or web page level. A non-limiting example of real-time Internet content acquisition is described further below with reference to FIG. 5.

At block 340, the search results produced by block 330 are presented to the end user and stored so as to allow further local manipulation (e.g., filtering, ranking, exporting and the like). In one embodiment, a list of companies having website content meeting the search query is caused to be displayed to the end user via a browser-based interface. As described further below, the list of companies may be presented in an interactive and hierarchical form in which various search statistics and/or various details regarding each company are available and can be revealed and/or hidden responsive to the end user selecting an interface element associated with the company of interest to expand the hierarchy to reveal the underlying layer of information for the particular company or collapse the hierarchy to hide the underlying layer of information for the particular company.

Depending upon the particular implementation, various operations may be performed on the search results. In the context of the present example, the operations include performing a new search, revising the existing search, filtering the search results, exporting the search results, and ranking the search results. To the extent the current search results were generated to provide the end user with prompt feedback for a limited sample set, the end user can also be provided with the option of confirming his/her desire to continue with a full search based on the current search request. At decision block 350, responsive to receipt of a selection of a search result operation from the end user via the browser-based interface, a determination is made regarding which operation has been requested by the end user. If the selected operation is to perform a new search or revise the existing search, processing loops back to block 310. If the selected operation is to perform filtering on the search results, then processing continues with block 360. If the selected operation is to export the current search results, then processing continues with block 370. If the selected operation is to perform ranking on the search results, then processing continues with block 380. If the selected operation is to perform a full search (e.g., confirming the end user is satisfied the limited sample set of search results is consistent with his/her intent), then processing loops back to block 320 where the constraints on the number of domain names included within the structured search query and/or geographical limitations (e.g., ZIP code) are removed and the full real-time search is launched.

At block 360, filtering parameter(s) are applied and the displayed search results are refreshed. In one embodiment, one or more user-selected filtering parameters are received from the end user via the browser-based interface and applied to the current set of search results and the filtered set of search results are presented to the end user via the browser-based interface. The filtering parameters(s) may include refining/editing the originally provided one or more search terms and/or phrases and/or by including/excluding various additional company characteristics or attributes. As described further below, with reference to FIG. 8F, search results may be over inclusive as a result of user-specified mandatory or ideal search terms and phrases being used on companies' websites in a different context than anticipated by the end user, for example. In such a scenario, the end user may specify one or more company characteristics or attributes, for example, for exclusionary filtering to cause undesired companies to be excluded from future search results. After the filtering parameter(s) are applied and the search results are redisplayed, processing loops back to decision block 350 where the end user can continue to refine the results as desired.

At block 380, ranking parameter(s) are applied and the displayed search results are refreshed. In one embodiment, the end user can control the order in which the search results are displayed by weighting the search terms and/or phrases associated with the search request. As described further below, with reference to FIG. 8H, the relative importance of ideal search terms/phrases can be defined by the end user by assigning scores (e.g., from 1 to 10) for each occurrence of a particular search term and/or phrase within the content of the websites. These scores can then be aggregated and the companies within the search results can be ranked based on their relative aggregated scores.

At block 370, the current set of search results as filtered and/or ranked in accordance with the end user's specified filtering parameters and ranking parameter(s) are exported to a user-selected modality. For example, the end user may export the current set of search results in PDF format, to an Excel file or a Word file. Alternatively or additionally, the end user may store the current search results as one of a variety of sub-data sets for future reference. In some embodiments, the Internet search engine may perform a periodic background process (e.g., daily, every other day, weekly, or the like) to refresh and/or update one or more of the stored search results based on the associated structured search query and any user-specified filtering and ranking parameters. In this manner, during subsequent sessions with the Internet search engine, the end user will have fresh search results for stored search sets.

Figure 4:
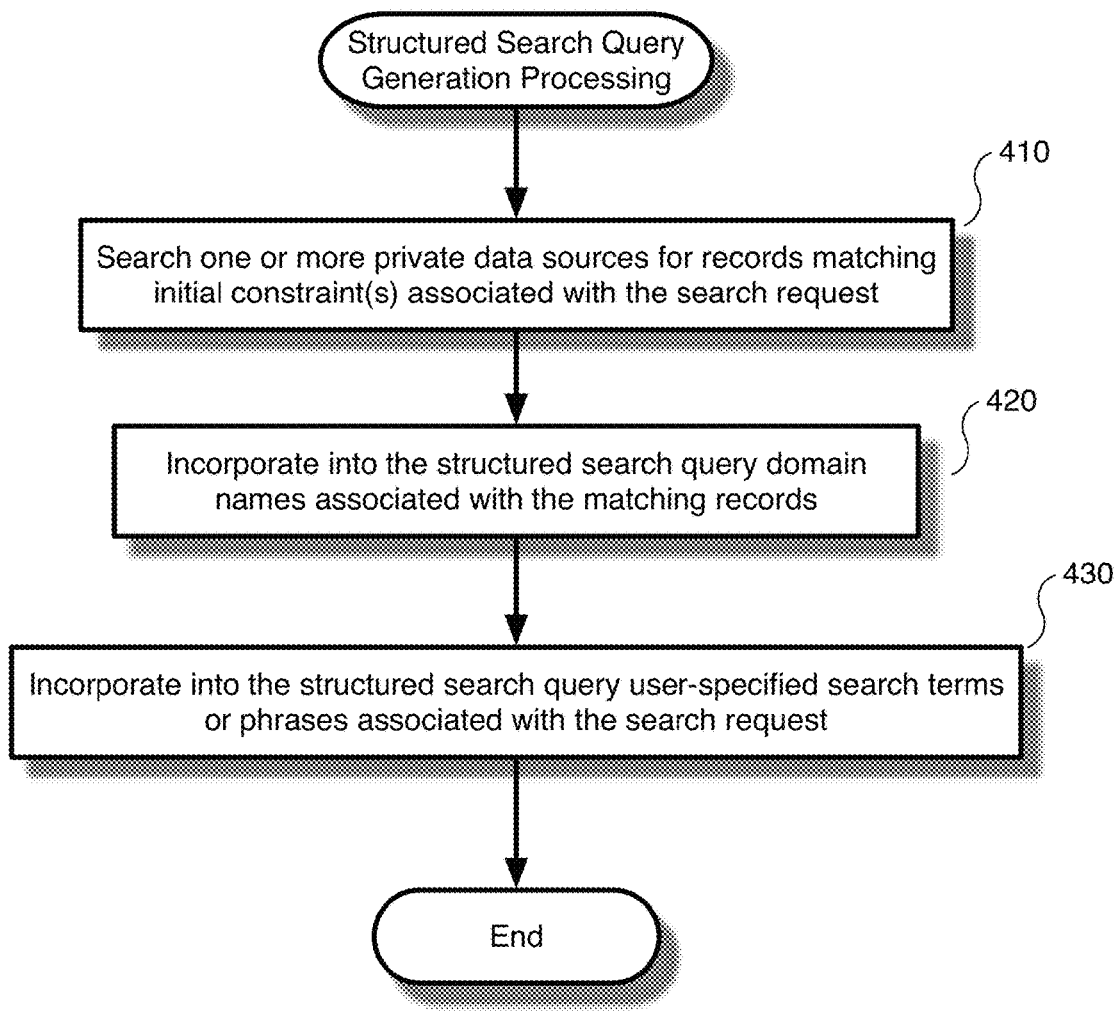
FIG. 4 is a flow diagram illustrating structured search query generation processing in accordance with an embodiment of the present disclosure.

FIG. 4 is a flow diagram illustrating structured search query generation processing in accordance with an embodiment of the present disclosure. As noted above in the Background, performance of search processing of real-time Internet content associated with potentially multiple billions of websites is currently impractical within reasonable search times. While existing Internet search engines assume end users are willing to tradeoff accuracy and freshness of search results in exchange for identification and delivery of potentially millions of search results in under one second, freshness and accuracy are important enough to certain Internet search activities (e.g., the identification of companies that might represent motivated prospective customers, clients or other potential business opportunities) that reasonable search times of one the order of a few hours to several hours are acceptable and can be achieved, in one embodiment, by requiring an end user-initiated search request to be constrained in some manner so as to allow a structured search query to be generated that is limited to a finite number of identifiable domains.

The processing steps described below, represent an example of processing that may be performed by block 320 of FIG. 3. As such, for purposes of the present example, it is assumed an end user-initiated search request has been previously received that includes one or more initial constraints and has been made available to the structured search query generation processing (e.g., by way of a function or procedure call, inter process communication (IPC), by way of message passing via a shared memory or one or more queues through which multiple asynchronous processes communicate or other mechanism).

At block 410, one or more private data sources are searched for records matching the initial constraint(s) specified by the user-initiated search request. The private data sources may include, but are not limited to, databases of company information (company databases), potentially a separate database for each language supported by the Internet search engine, proprietary databases (e.g., a subscriber's list of companies or prospects and/or CRM data), and government or compiled data. In one embodiment, a private data source includes a record for each company including at least the company name, a website domain and a number of additional fields for storing company attributes/characteristics. In one embodiment, the one or more initial constraints may represent characteristics or attributes of companies of interest to the end user. Those skilled in the art will appreciate searching a database based on an attribute on which indexing has been performed can be performed more efficiently in terms of time, but by trading off the additional storage requirements of the data structures maintained for the index. As those skilled in the art will also appreciate, there are numerous characteristics or attributes of companies that might be used to distinguish among companies. For example, the one or more constraints may relate to one or more of geography (e.g., a location, specified by one or more of a country, state, city and/or ZIP code, an address or the like), distance from a particular location (e.g., businesses within 10 to 20 miles from the subscribing company's address, ZIP code, coordinates (e.g., GPS coordinates, latitude and longitude or the like) or other user-specified address, ZIP code or coordinates), a type of industry, a number or a range of employees, an annual revenue or range, whether the company is public or private (i.e., whether shares of the company are publicly traded), the company's ownership (e.g., woman owned, veteran owned, minority business enterprise, etc.) and a year in which the company was founded or timeframe since the company was founded.

In any event, for purposes of illustration, assume the private data source being searched is a commercially available company database used for marketing and/or lead generation, for example, containing information regarding millions of US and/or foreign companies, including, among other information, company names, information identifying a type of industry (e.g., North American Industry Classification System (NAICS) code(s), Standard Industrial Classification (SIC) code(s) and/or corresponding textual descriptions), SIC2 category, SIC4 category, SIC8 category, state code, city, ZIP code, address, phone number, domain name, market, revenue data (e.g., annual revenue), coordinates, location type (e.g., branch, headquarters, etc.), market variable, and employment data (e.g., number of employees). In this manner, an end user-initiated search query specifying an initial constraint as "industry type=Computer Software & Hardware," for example, can be used to query the private data source to identify domain names of those companies in the specified industry.

At block 420, the domain names associated with the matching records identified in block 410 are incorporated into the structured search query.

As noted above, with reference to FIG. 3, in one embodiment, the structured search query may initially be defaulted to produce a relatively small sample set so as to give the end user prompt feedback regarding the nature of their search request, which could be unintentionally over or under inclusive. In this manner, the end user may be provided with an opportunity to fine-tune their search request before performing a full search of real-time Internet content for all companies. In such an embodiment, when a sample search is to be performed (e.g., as indicated by a global flag or a parameter communicated to the structured search query generation processing in some other manner), rather than incorporating all of the domain names associated with the matching records identified in block 410, the domain names associated with the first X (where X is a predetermined or configurable parameter) matches may be incorporated into the structured search query being built. Alternatively or additionally, the sample search may be limited to domain names associated with matching records within a user-specified ZIP code. For example, a combination of a ZIP code and a predefined numerical limit may be used and the geographic area can be expanded outwardly until the predefined numerical limit is achieved or until all domain names associated with the matching records identified in block 410 are used.

At block 430, the user-specified search terms or phrases associated with the search request are also incorporated into the structured search query.

Figure 5:
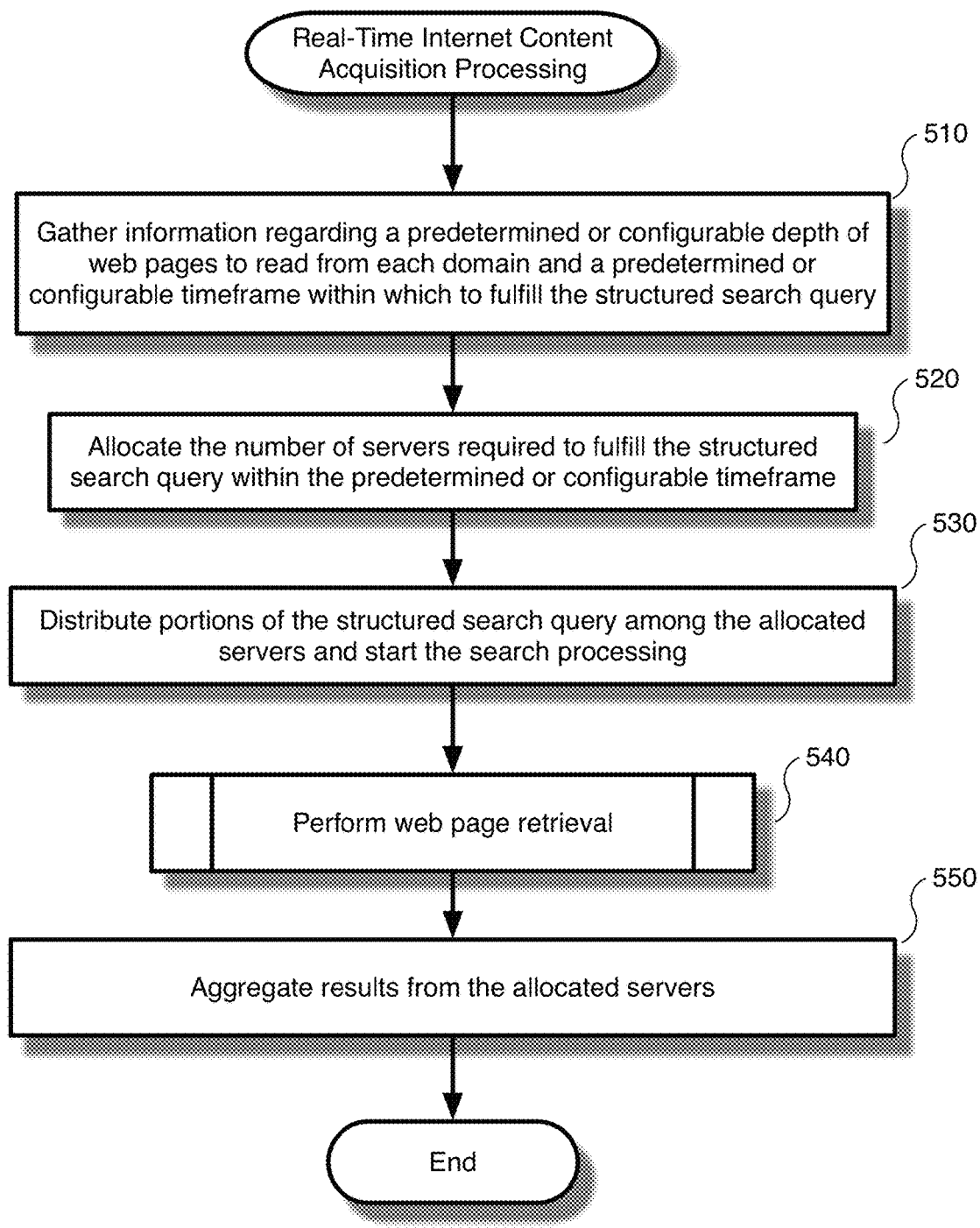
FIG. 5 is a flow diagram illustrating real-time Internet content acquisition processing in accordance with an embodiment of the present disclosure.

FIG. 5 is a flow diagram illustrating real-time Internet content acquisition processing in accordance with an embodiment of the present disclosure. In the context of the present example, it is assumed the real-time Internet content acquisition processing is performed based on a structured search query specifying multiple domain names and one or more search terms/phrases. The structured search query may be generated, for example, by the process described above with reference to FIG. 4.

At block 510, information regarding a predetermined or configurable depth of web pages to be read from each domain and a predetermined or configurable timeframe in which the structured search query is desired to be completed is received. For example, instead of processing every web page of each domain, a limited number of web pages of each domain may be processed in accordance with a breadth first search (or depth first search). The desired timeframe for completing structured search queries may also be a configurable or predefined system parameter. For example, the company providing the Internet search engine may make various service level commitments to subscribers in accordance with a gold, silver and bronze service plan in which gold-level subscribers are expected to be provided with search results in under three hours, silver-level subscribers are expected to be provided with search results in under four hours and bronze-level subscribers are expected to be provided with search results in under five hours. Alternatively or additionally, subscribers may be offered the option of paying additional fees to accelerate search processing on a search-by-search or session-by-session basis.

Empirical data evaluated by the assignee of the present invention suggests AWS model m5.larges (with 2 virtual CPUs, 8 GB of memory, up to 3,500 Mbps of dedicated EBS bandwidth and having network performance of up to 10 Gbps) are typically capable of processing web pages at a rate of about one web page per 0.6 seconds.

Based on this empirical data and the number of web pages that are expected to be processed based on the number of domains associated with the structured search query, the number of virtual servers (or "instances" in Amazon Web Services (AWS) Elastic Compute Cloud (EC2) parlance) required to fulfill the structured search query can be determined at block 520 for a given timeframe and the appropriate number of virtual servers can be dynamically launched to handle the structured search query.

At block 530, the structured search query is distributed among the virtual servers launched in block 520. In one embodiment, the structured search query is partitioned on a domain-by-domain basis. For example, multiple domain-based structured search queries can be created each having a single one of the domains specified by the original structured search query. As described further below, in one embodiment, messages can be exchanged between search processing instances and a search manager instance via a message queue polled by the search processing instances, for example. In this manner, as search processing instances complete their work for a particular domain-based structured search query, they can pull another domain-based structured search query from the shared message queue. Alternatively, each virtual server can be assigned a subset of domains from the original structured search query to process; however, this approach may not make the most efficient use of resources as some domains may end up being processed faster than others resulting in some virtual servers being idle as others continue to process their allocated subset of domains.

At block 540, web page retrieval processing is performed. In one embodiment, each virtual server independently retrieves and scans the desired depth of web pages for a current website domain it is processing based on the one or more user-specified search terms/phrases. A non-limiting example of web page retrieval processing is described further below with reference to FIG. 6.

At block 550, the search results produced by the set of virtual servers launched to handle the structured search query are aggregated. In one embodiment, as each virtual server completes its processing of a domain-based structured search query for a particular domain of the list of domains contained in the original structured search query, it places its results onto a results queue. A search manager instance may pull the search results from the results queue and perform search result aggregation processing on behalf of a master controller.

As noted above, in one embodiment, because performing a search of real-time Internet content can require a significant amount of time, the search space, in terms of the number of domains may be intentionally limited by the Internet search engine and/or by the end user to a relatively small sample set of websites so as to provide the end user with immediate feedback regarding the types of results that will be produced by the search request in its current form. In this manner, the end user is provided with an opportunity to revise a potentially overly broad or overly narrow search request without having to wait several hours only to find out the search request could have been defined in a more optimal manner. Those skilled in the art will appreciate there are numerous approaches for implementing this domain limitation. For example, each new search request may be initially limited by default and the end user can be provided with the ability to override this default in favor of a full search of those domains meeting his/her initial constrain(s). Alternatively, each new search request may be initially defaulted to a full search, unless a limited sample search is specifically requested by the end user. Further still, the number of domains to be included as part of the limited sample search may be a user-configurable or predefined parameter.

In any event, one option noted above for performing a limited sample search representative of the end user's current search request involves limiting the number of domains included within the structured search query. For purposes of generality, it is noted that various other mechanisms are contemplated for limiting the domain search space. For example, if a limited sample search is called for, prior to or as part of block 510, the structured search query at issue can be modified so as to limit the number of domain names to the desired sample size. Alternatively, as the domain-based structured search queries are generated in block 530, the number of domain-based structured search queries can be limited to the desired sample size and the resource calculations associated with block 520 can also be informed of the desired sample size so as to not over allocate resources.

In one embodiment, the real-time Internet content processing may also include identification and creation of domain-based structured search queries for subdomain(s) associated with the domain names expressly identified within the structured search query. This may be enabled, for example, by way of a global flag or a parameter communicated to the real-time Internet content acquisition processing in some other manner. Alternatively, the structured search query may already include identification of subdomains as a result of such information being included in one or more of the private data sources, for example, or as a result of such subdomains being identified and included within the structured search query during structured search query generation processing, for example.

Figure 6:
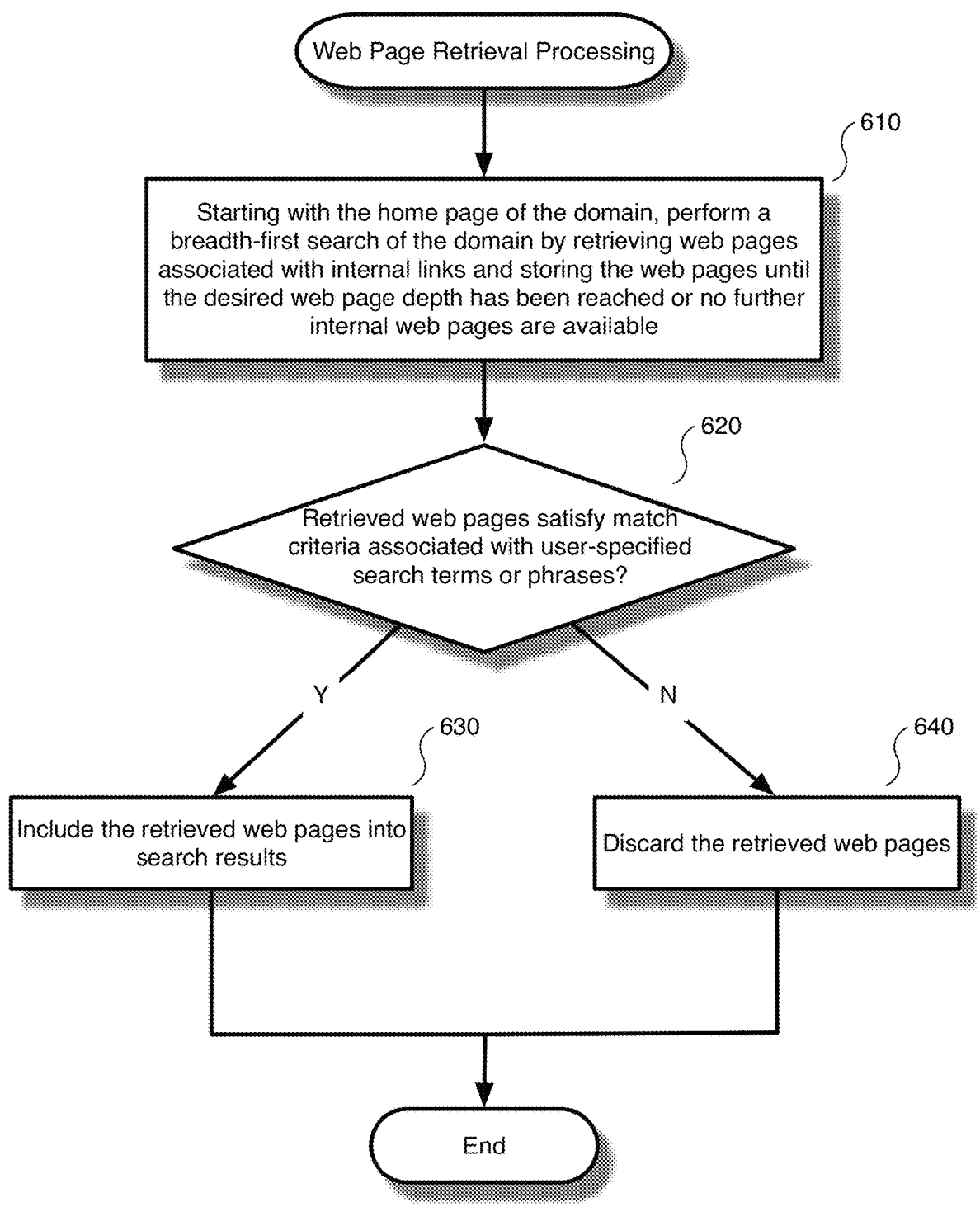
FIG. 6 is a flow diagram illustrating web page retrieval processing in accordance with an embodiment of the present disclosure.

FIG. 6 is a flow diagram illustrating web page retrieval processing in accordance with an embodiment of the present disclosure. In the context of the present example, the unit of searching allocated to or performed by a search process or a search server is assumed to be at the level of a domain name. As discussed further below, in one embodiment, the web page retrieval processing is performed based on a domain-based structured search query pulled from a request queue by a search process or a search server. The domain-based structured search query may be generated, for example, by the process described above with reference to FIG. 5.

For purposes of determining relevance of a website's content to a set of search terms/phrases, it is not necessary to scan every web page associated with a website domain. As such, in one embodiment, a configurable or predetermined number of web pages (at times referred to herein as a depth of web pages or search depth) is sampled from each website domain being evaluated. In one embodiment, the default search depth is between approximately 10 and 100 web pages. The low-end of this range does not mean it is the minimum number of web pages required to return satisfactory results and the high-end of this range does not mean it is a maximum number of web pages. Those skilled in the art will appreciate the predetermined or configurable search depth simply represents a tradeoff among various factors, including, but not limited to, the speed of search query processing and the amount of virtual and/or physical resources (e.g., memory resources and processing resources) required. Empirical data suggests a search depth of 20 web pages produces satisfactory results in the majority of situations. Those skilled in the art will appreciate the search depth can be adjusted up or down for particular usage scenarios by an administrator of the Internet search engine or can be a parameter capable of being configured by end users (e.g., on a session-by-session or a search-by-search basis) or a subscriber account administrator (e.g., on a session-by-session or a subscriber-by-subscriber basis).

At block 610, starting with the home page, content associate with a website domain is retrieved and stored by traversing the website domain in accordance with a Breadth First Search. As web pages are retrieved, they are parsed to identify internal links (i.e., links to web pages within the website domain at issue). The retrieval and traversal continues until the desired web page depth has been reached or no further internal links are found. Those skilled in the art understand that Breadth First Search is one of many possible tree traversal algorithms. In alternative embodiments, one or more other tree traversal algorithms (e.g., Depth First Search, Fish Search, A* Search or Adaptive A* Search) or modifications thereof may be used alone or in various combinations.

At decision block 620, the retrieved web pages are scanned and evaluated to determine whether they satisfy match criteria associated with user-specified search terms or phrases. In one embodiment, the user-specified search terms or phrases include one or more of mandatory search terms or phrases, ideal search terms or phrases and exclusionary search terms or phrases. Mandatory search terms or phrases are those terms or phrases that must be present within the content of at least one web page of the website domain for the match criteria to be considered satisfied. Ideal search terms or phrases are those terms or phrases that the end user would reasonably expect to be present within the content of one or more web pages of a website domain, but they may or may not be present as companies may use different terminology than specifically called out by the end user.

Exclusionary search terms or phrases are those terms or phrases that must not be present within the content of any web page of the website domain for the match criteria to be considered satisfied. When the match criteria are satisfied, processing continues with block 630; otherwise, processing continues with block 640.

At block 630, the retrieved web pages from the web domain at issue are included as part of a collection of search results and returned to the upstream process or upstream server that requested the web page retrieval processing. The search results may also include information identifying the domain or company with which the search results are associated as well as other statistics associated with the website domain and/or web page content.

At block 640, the retrieved web pages are discarded as the content associated therewith has either been identified as specifically not of interest to the end user or did not meet the requirements for being deemed relevant to the end user.

While in the context of the simplified example presented in FIG. 6, all web pages expected to be processed for a given domain are shown as being retrieved at block 610 and scanned at decision block 620, in one embodiment, when one or more exclusionary conditions (e.g., one or more exclusionary terms or phrases) are part of the search request, for example, the web page retrieval processing can be performed more efficiently by applying the exclusionary conditions as individual web pages are retrieved. In this manner, web page retrieval processing can be stopped immediately upon determining the content associated with the domain includes an exclusionary term or phrase.

In one embodiment, the web page retrieval processing also includes counting occurrences terms/phrases appearing on those of the web pages of a web site domain that are evaluated. As such, the results returned can also include various statistics about the content of the website. For example, a configurable or predetermined number of most frequently appearing terms/phrases can be reported as part of the search results for a particular website domain. As discussed further below, all or a subset of these most frequently appearing terms/phrases can be presented to the end user to facilitate further refinement of his/her search request, performance of local filtering of the search results and/or performance of local ranking of the search results by aggregating scores assigned by the end user to particular terms/phrases and sorting the order in which companies are presented to the end user based on the aggregated scores as described further below.

In one embodiment, the web page retrieval processing and/or subsequent local post-processing of such web content may include evaluating technologies associated with the website domain. The use of certain web technologies by companies as reflected by the source code of their web content may make such companies more relevant to certain types of subscribers.

While in the context of FIGS. 5 and 6, searching is said to be "allocated" on the basis of a domain, those skilled in the art will appreciate website domains can be pre-parsed in accordance with the desired website traversal algorithm (e.g., Breadth First Search, Depth First Search, Fish Search, A* Search or Adaptive A* Search) and instead of queuing domain-based structured search queries for downstream processing, web page-based structured search queries, representing individually identified web pages, can be queued for downstream processing.

Figure 7:
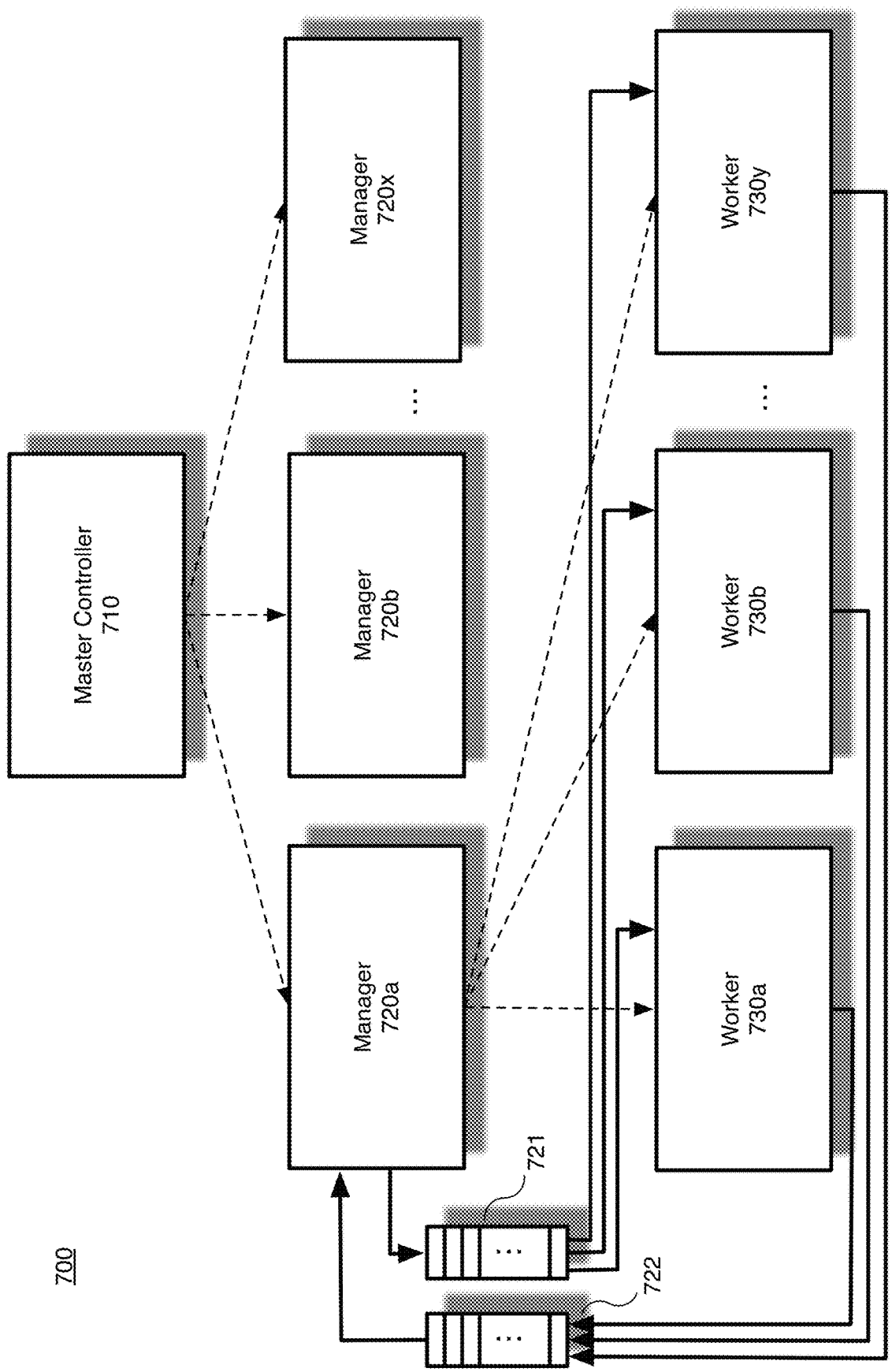
FIG. 7 illustrates an exemplary architecture of an Internet search engine in accordance with an embodiment of the present invention.

FIG. 7 illustrates an exemplary architecture 700 of an Internet search engine in accordance with an embodiment of the present invention in which at least some portion of search processing functionality (e.g., the processing associated with one or more of FIG. 4, FIG. 5 and FIG. 6) is implemented within a cloud service. As noted above, a non-limiting example of a cloud service is Amazon Web Services (AWS) with Elastic Compute Cloud (EC2), which provides scalable virtual servers (called instances) that facilitate resizable computing capacity capable of supporting a multi-tenant Internet search service and allowing the Internet search service to pay only for capacity that is actually used.

In the context of the present example, architecture 700 includes a master controller 710, multiple managers 720a-x, multiple workers 730a-y, a request queue 721 and a results queue 722. According to one embodiment, Internet search engine may make use of dynamic resizable computing capacity provided by the cloud service provider to dynamically launch by manager 720a a desired number of instances (represented in FIG. 7 as Workers 730a-y)

In the context of the present example, search requests initiated by end users of subscribers (e.g., received via a graphical user interface, such as that described further below) are assumed to be received by master controller 710 and distributed to dynamically instantiated managers 720a-x. As noted above, in one embodiment, search requests are transformed into structured search queries specifying one or more domains. In the current example, assuming a structured search query specifying multiple domains has been assigned to manager 720a by master controller 710, the number of workers 730a-y to be instantiated by manager 720a can be determined mathematically as described further below.

Each launched worker instance (e.g., workers 730a-y) retrieves domain information from the manager's queue (e.g., request queue 721) to read through and process the appropriate domain. A non-limiting example of a queue service that may be used to create request queue 721 and results queue 722 is Amazon Simple Queue Service (SQS), which provides asynchronous messaging to allow various application components (in this case, manager 720a and workers 730a-y) to communicate in the cloud. The information gained from reading through the domain is stored on the worker instance (or passed back to manager 720a via results queue 722), and the worker will retrieve new domain information from the manager's queue. This process continues until there are no more domains to receive from the manager's queue. At this point, the workers can upload their search data to files on Amazon's S3. These files can be later downloaded by master controller 710 and entered into a search result database (e.g., search results database 231) of Internet search engine.

In one embodiment, the structured search query can be transformed into multiple domain-based search queries (e.g., one domain-based search query for each of the multiple domains specified by the structured search query). The multiple domain-based search queries can be individually queued on request queue 721 of manager 720a from which each of workers 730a-y retrieve a domain-based search query when they are available to perform searching, thereby allowing the search processing to be distributed across workers 730a-y. When workers 730a-y have completed processing of a domain-based search query on the web site domain at issue, they may communicate their search results to manager 720a by placing the search results on results queue 722 of manager 720a. allow each of workers 730a-y to retrieve a domain-based search query from request queue 721

Returning now to how a manager (e.g., manager 720a) can determine the number of workers 730a-y to be instantiated, in one embodiment, information regarding the time required to complete previous searches is maintained to facilitate the making of predictions regarding future search durations. As such, in one embodiment, the appropriate number of workers 730a-y can be allocated to finish the structured search query within a predetermined time constraint by utilizing the knowledge regarding the timing of previous searches. For instance, for a structured search query specifying 100,000 domains and an average time per domain of 0.1 seconds, it would take 10,000 seconds to complete, or approximately 2 hours and 45 minutes. This average time per domain accounts for 10 instances (e.g., workers 730a-y) each assumed to be running 8 processes each for a total of 80 processes. These 80 processes can read through 10 domains per second or 1 domain every 0.1 seconds. Each individual process can therefore read through ⅛ of a domain per second. Utilizing this information, the appropriate number of instances can be allocated to complete the structured search query in the predetermined time constraint. For example, based on the average time per domain noted above, completing a structured search query specifying 100,000 domains in one hour would require 222 processes, completing those domains in two hours would require 111 processes, and completing those domains in three hours would require 74 processes. Since each worker utilizes 8 processes in this example, a one hour search requires 28 workers, a two hour search requires 14 workers, and a three hour search requires 10 workers. The number of processes per worker is chosen to utilize a majority of the currently selected (e.g., m5.large) instance's CPU without overloading it and could be higher or lower depending on which instance type is used and that instance's hardware specifications. As such, those skilled in the art will appreciate the above scenarios are provided for sake of completeness, but are not intended to be limiting.

Use Case/Example

As noted above, as a result of limiting the scope of Internet content that is to be searched to a specific set of domain names, for example, identified by applying one or more user-specified initial search constraints to one or more private data sources, completion of a search of real-time Internet content becomes achievable within a reasonable amount of time and by extension numerous usage models of real-time Internet content also become feasible. While one specific use case relating to customer prospecting is described below with reference to exemplary user interface screen shots in order to illustrate a particular practical application and implementation relating to searching real-time Internet content, this use case is not intended to be limiting as the assignee contemplates numerous other search applications and objectives. For example, an end user or subscriber of the Internet search engine described herein may wish to identify companies or products/services offered by such companies for purposes other than or in addition to customer prospecting, including, but not limited to, for the purpose of performing industry, product or service research, government administration, identifying potential merger and/or acquisition opportunities, licensing, partnering, joint development, joint research, collaboration, and/or otherwise obtaining actionable business intelligence from real-time Internet content.

Figure 8A:
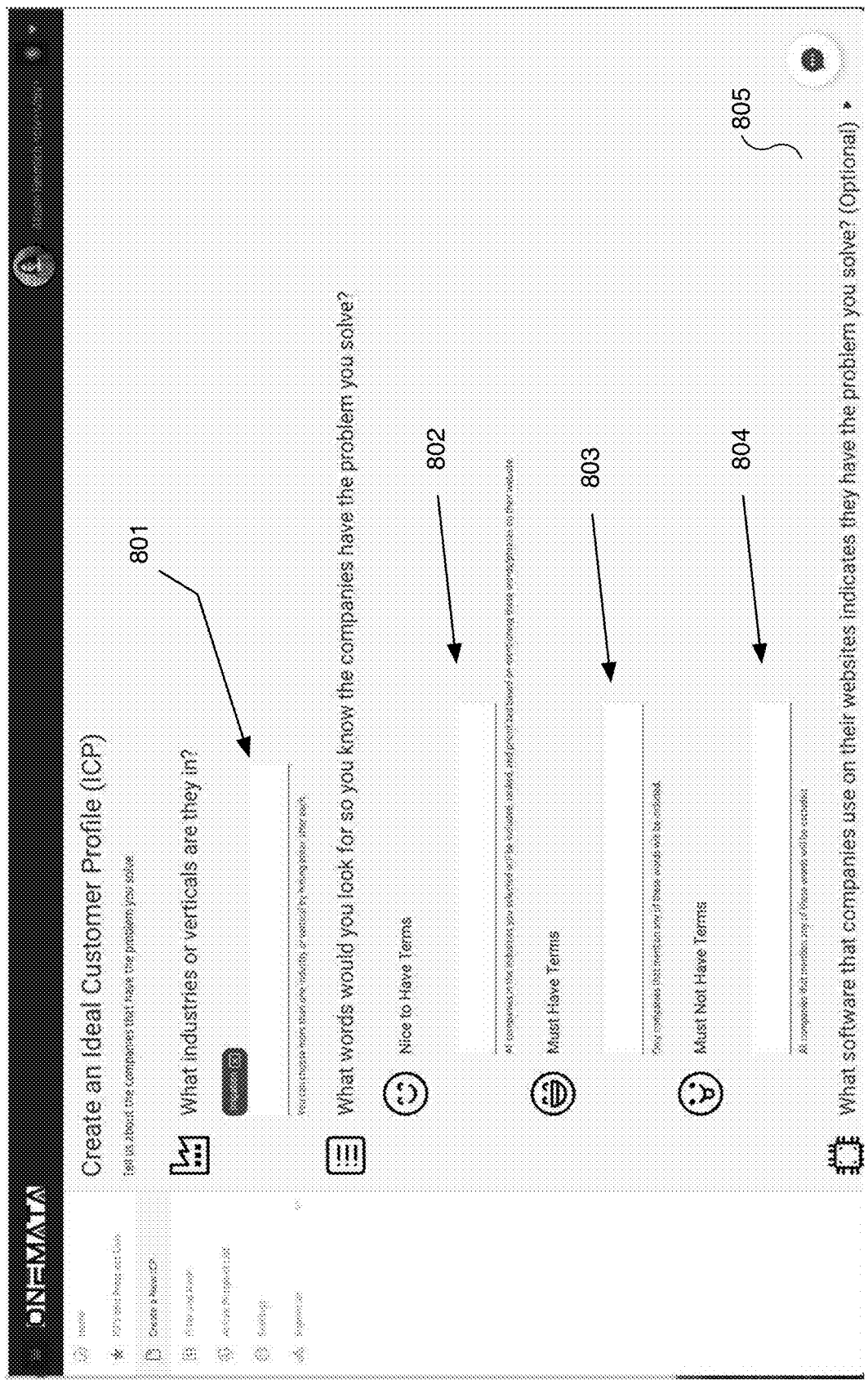
FIG. 8A illustrates a portion of an Ideal Customer Profile (ICP) screen of a user interface of a SaaS based Internet search engine in accordance with an embodiment of the present invention.

FIG. 8A illustrates a portion of an Ideal Customer Profile (ICP) screen 800 of a user interface of a SaaS based Internet search engine in accordance with an embodiment of the present invention. In the context of the present example, ICP screen 800 guides an end user of a subscriber of the Internet search service through the process of creating an ICP. In one embodiment, an ICP is intended to describe companies (in terms of various characteristics/attributes and search terms/ phrases) that have a problem (e.g., a need for a products/ service) that is solved by the subscriber. In this manner, when an ICP is properly specified and/or refined, use of the ICP, which represents an example of a search request as described above with reference to FIG. 3, to generate a constrained search query with reference to one or more private data sources produces fresh data regarding what should be highly motivated prospects when applied to real-time Internet content.

ICP screen 800 includes a first user interface element 801 (e.g., a text entry field, a dropdown list, a list box, or the like) for specifying one or more initial constraints, a second user interface element 802 (e.g., a text entry field) for entering zero or more "nice to have terms," a third user interface element 802 (e.g., a text entry field) for inputting zero or more "must have terms," a forth user interface element 804 (e.g., a text entry field) for submitting zero or more "must not have terms," and a link 805 to a fifth user interface element (not shown) in the form of, for example, a text entry field, checkboxes, radio buttons, a dropdown list, a list box, or the like, for identifying one or more technologies desired to be reflected in the source code of a prospect's web site.

In one embodiment, the first user interface element 801 allows the subscriber to manually enter or select from a predefined list one or more industries or industry verticals.

For purposes of illustration, the subscriber may be a business that makes residential sprinkler system controls that conserve water. So, the subscriber may be looking for residential sprinkler installers to resell the subscriber's equipment. Given there are over 300,000 sprinkler installers in the United States, it is not time or cost effective for the subscriber to attempt to contact all of them by phone or direct mail, for example. As such, it would be helpful for the subscriber to narrow down the list of sprinkler installers.

In the present example, the subscriber knows their best installers will be those companies in the irrigation industry who are already passionate about and have built a business around water conservation. As such, the subscriber begins building the ICP by selecting or inputting the "irrigation" industry with the first user interface element 801. A discussion regarding creation of search terms and phrases by the subscriber continues with reference to FIGS. 8B-D.

Figure 8B:
FIG. 8B illustrates a portion of the Ideal Customer Profile (ICP) screen after the end user has specified a mandatory term/phrase in accordance with an embodiment of the present invention.
Figure 8B:
Figure 8B:

FIG. 8B illustrates a portion of the Ideal Customer Profile (ICP) screen 800 after the end user has specified a mandatory term/phrase in accordance with an embodiment of the present invention. Continuing with the example subscriber seeking to identify appropriate residential sprinkler installers, the subscriber now uses third user interface element 803 to create one or more "must have term" (also, referred to herein as a mandatory search terms/phrases). In the context of this example, a necessary, but not sufficient condition, for a company to be considered a match for the ICP is all specified mandatory search terms or phrases must be present within the content of at least one web page of the company's website domain.

In view of the definition of a mandatory search term/ phrase, subscribers will need to take care not to include too many mandatory search terms/phrases as this can severely limit the number of search results returned. It is often best for a subscriber to start more broadly and then iteratively refine the ICP based on feedback from running one or more quick sample searches (e.g., limited in geography to a particular ZIP code, for example, or limited in scope to a relatively small number of domain names) before applying the ICP to real-time Internet content in a less constrained manner. As such, in the context of the present example, the subscriber starts by including only a single mandatory term, i.e., "sprinkler," for third user interface element 803.

Figure 8C:
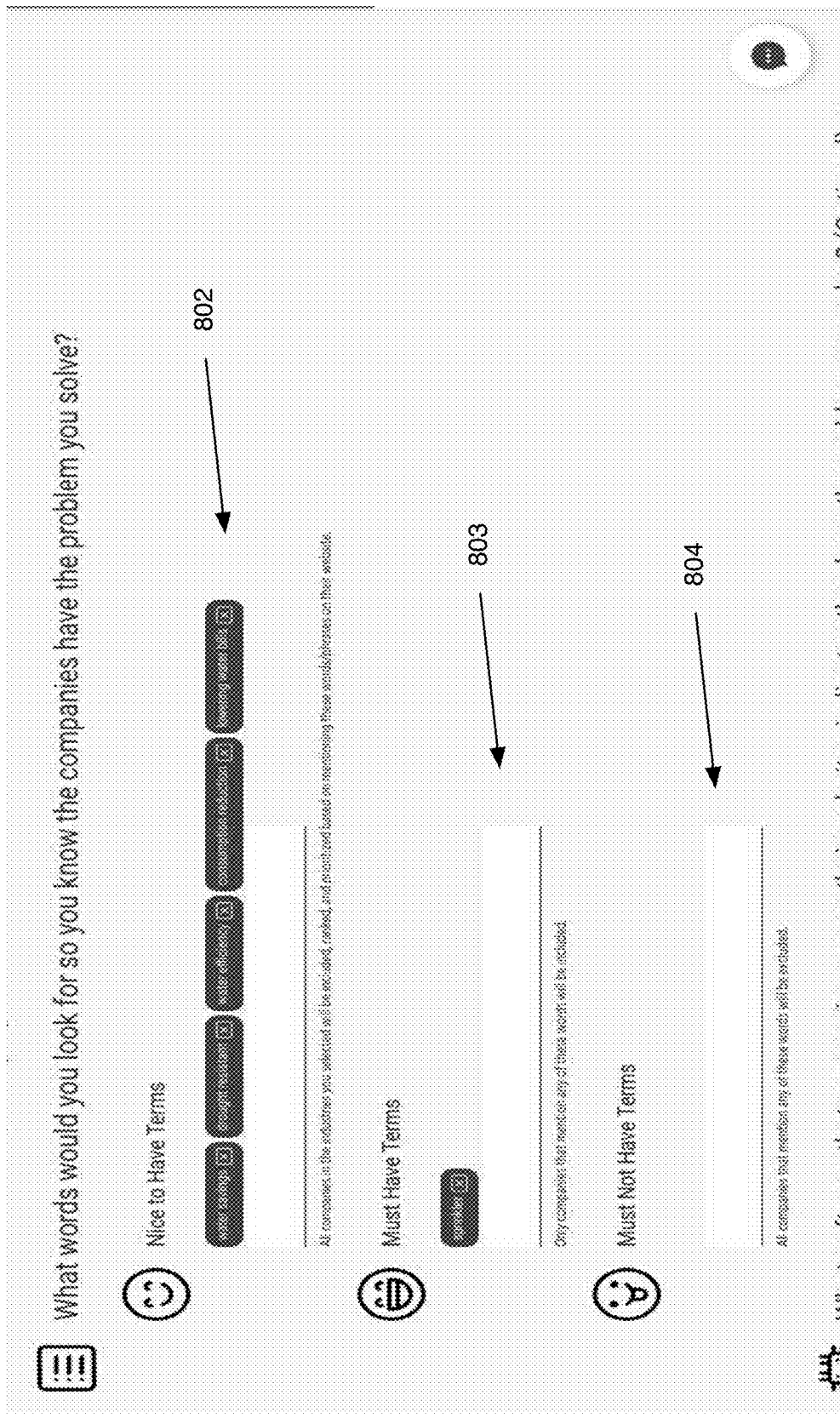
FIG. 8C illustrates a portion of the Ideal Customer Profile (ICP) screen after the end user has specified multiple ideal terms/phrases in accordance with an embodiment of the present invention.

FIG. 8C illustrates a portion of the Ideal Customer Profile (ICP) screen 800 after the end user has specified multiple ideal terms/phrases in accordance with an embodiment of the present invention. Continuing with the example subscriber seeking appropriate residential sprinkler installers, the subscriber now uses second user interface element 802 to create one or more "nice to have terms" (also, referred to herein as a ideal search terms/phrases). In the context of this example, ideal search terms or phrases are those terms or phrases that the subscriber would reasonably expect to be present within the content of one or more web pages of a website domain of a prospect, but they are not required to be present within a company's website domain for the company to be considered a match for the ICP.

In connection with specifying ideal search terms/phrases, one challenge the subscriber will need to consider is the businesses they seek to identify may talk about themselves in different terms, other than or in addition to water conservation in their website content. For example, terms/phrases that might reasonably be expected to appear within website domains of companies in the irrigation industry that are interested in water conservation include "water savings," "drought resistance," "water efficiency," "consumption reduction," "lowering water bills" and the like.

Since there is little risk in over-inclusiveness in relation to ideal terms/phrases, in this example, the subscriber has specified all of the above-listed phrases as ideal search terms/phrases within second user interface element 802.

Figure 8D:
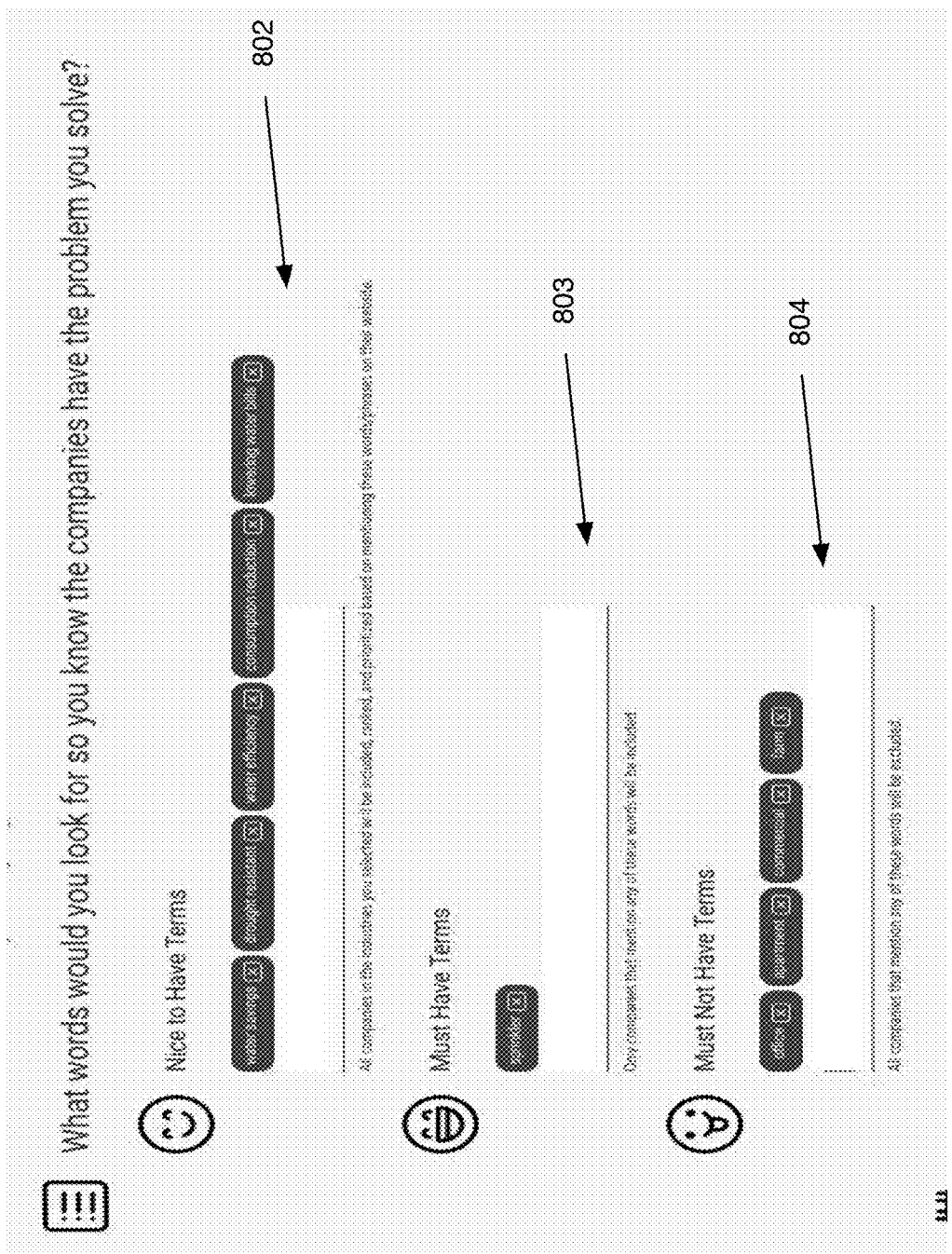
FIG. 8D illustrates a portion of the Ideal Customer Profile (ICP) screen after the end user has specified multiple exclusionary terms/phrases in accordance with an embodiment of the present invention.

FIG. 8D illustrates a portion of the Ideal Customer Profile (ICP) screen 800 after the end user has specified multiple exclusionary terms/phrases in accordance with an embodiment of the present invention. Continuing with the example subscriber that makes residential sprinkler system controls for conserving water, the subscriber now uses forth user interface element 804 to specify one or more "must not have term" (also, referred to herein as exclusionary search terms/phrases). Exclusionary search terms or phrases are those terms or phrases that must not be present within the content of any web page of a company's website domain for the company to be considered a match for the ICP.

Since the subscriber only deals with residential irrigation companies, in this example, the subscriber has decided to exclude the terms "office," "apartment," "commercial," and "farm" by specifying these terms with the forth user interface element 804. When the subscriber is done specifying one or more initial constraints, e.g., industry types or industry verticals, and entering desired search terms/phrases, e.g., one or more ideal terms/phrases, mandatory terms/phrases and/or exclusionary terms/phrases, the subscriber can submit the ICP to initiate performance of a search of real-time Internet content. As noted above, the search may be performed as a sample search (in this case, a sample ICP search, which can typically be completed within minutes) or a full ICP search, which can take on the order of a couple hours to several hours, depending upon the number of companies in the one or more private data sources that satisfy the initial search constraint(s). In one embodiment, the subscriber can provide location information (e.g., geolocation information, address, or a ZIP code) to constrain the search for purposes of receiving relatively quick feedback on how the search will perform before incurring the longer timeframe for receiving results of a full ICP search. Depending upon the particular implementation, when a sample ICP search is requested, the Internet search engine may define a predetermined or configurable radius based on the specified location information and constrain the resulting structured search query generated based on the initial constraint(s) specified by the ICP and one or more private data sources. For example, the initial constraint(s) may initially be used to identify companies within the one or more private data sources meeting the initial constraints and further limit the identified companies to those located within the predetermined or configurable radius. Then, as described above, a structured search query may be generated for the sample ICP search based on a list of domain names corresponding to the limited set of identified companies whose content is to be searched for the user-specified search terms/phrases. Alternatively, if a full ICP search is to be performed, the structured search query is generated based on a list of domain names corresponding to the companies identified based on application of the initial search constraint(s) to the one or more private data sources.

Figure 8E:
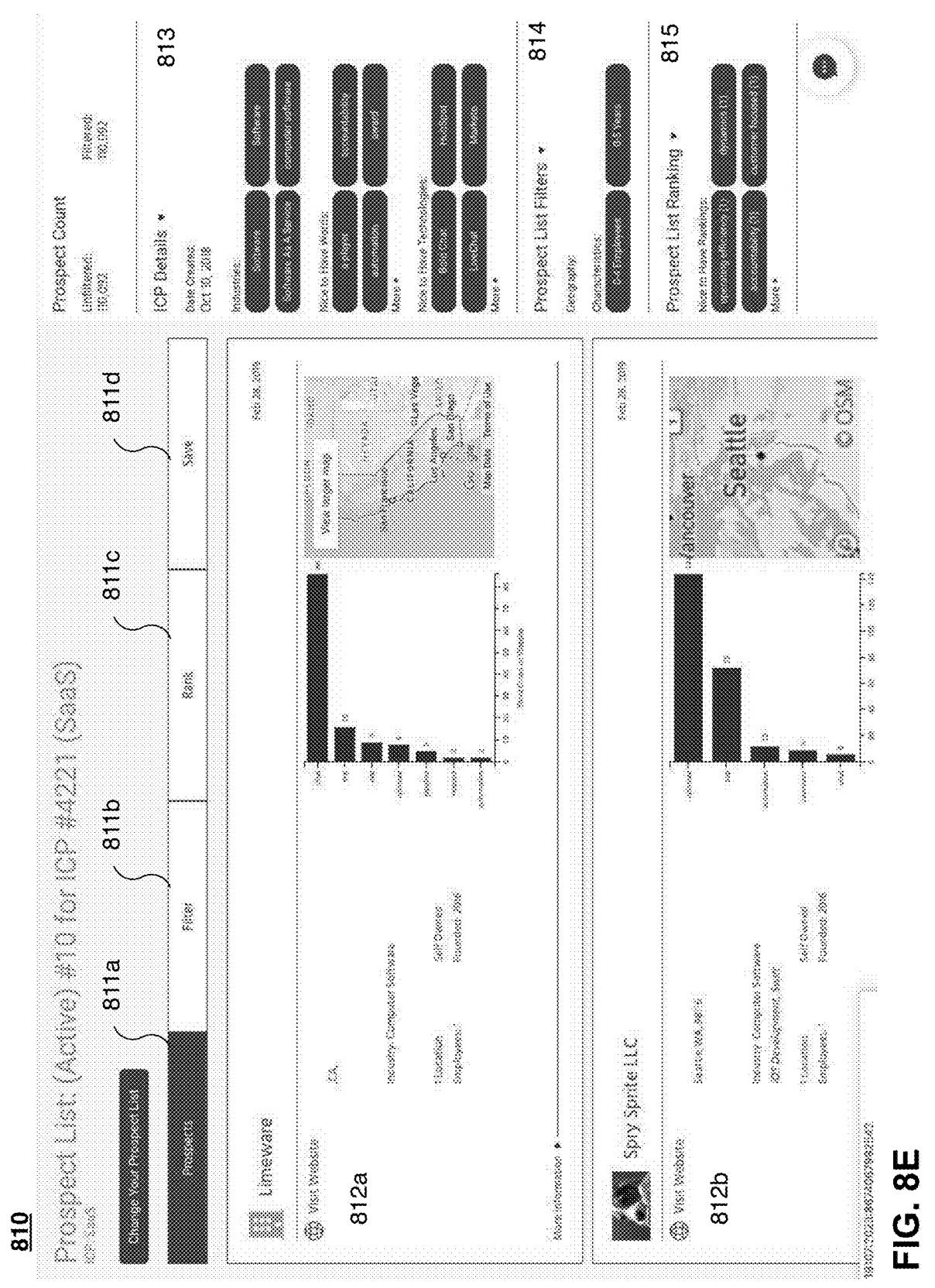

FIG. 8E illustrates a portion of prospect list screen 810 of a user interface of a SaaS based Internet search engine in accordance with an embodiment of the present invention. Prospect list screen 810 is shown including multiple tabs 811a-d. In the present example, the currently active tab is prospects tab 811a. The subscriber can easily switch between various screens of the user interface by selecting one of the other tabs 811b-d. By selecting filter tab 811b, the subscriber is presented with a search result filtering screen, an example of which is described below with reference to FIG. 8F. By selecting rank tab 811c, a search result ranking screen is displayed to the subscriber, examples of which are described below with reference to FIGS. 8G and 8H. By selecting save tab 811d, the subscriber may be presented with a save search results screen where the subscriber can save the current set of search results for future reference and/or export the search results to one or more file formats (e.g., comma separated values (CSV), Portable Document Format (PDF), or the like).

In the context of the present example, it is assumed the ICP specified with reference to FIGS. 8A-D has been used to generate a structured search query that has been used to search real-time Internet content of website domains associated with companies in one or more private data sources (e.g., a company database) meeting the initial search constraint(s). In one embodiment, the companies identified as having web content satisfying match criteria for the search terms/phrases by the Internet search engine are presented to the subscriber on prospect list screen 810 in the form of a list of company records, including company records 812a-b.

Prospect list screen 810 also includes an area 813 providing information regarding ICP details, an area 814 providing information regarding prospect list filters and an area 815 providing information regarding prospect list ranking, Area 813 identifies the one or more initial search constraints (e.g., the selected industries and/or industry verticals) and the user-specified search terms/phrases (e.g., the mandatory terms/phrases, the ideal terms/phrases and the exclusionary terms/phrases) that were employed to perform the search that produced the search results presented (e.g., the list of company records). To the extent the subscriber has already specified one or more filtering criteria, area 814 identifies the filtering criteria that have been locally applied to the search results to produce the list of company records. To the extent the subscriber has already specified one or more ranking criteria, area 815 identifies the ranking criteria that have been locally applied to the search results to produce the ordering of the list of company records.

As often companies will be miscategorized, intentionally or unintentionally, after reviewing the search results, the subscriber can perform further refinements to winnow the list of company records to those deemed most relevant. For example, in the context of the example subscriber searching for appropriate residential sprinkler installers, a tree trimming company may be included among the search results due to the company's website including a discussion about how using sprinklers too much or too little can damage trees. So, despite the fact that the tree trimming company included the mandatory term/phrase "sprinkler," the tree trimming company is not a suitable prospect for the subscriber. In such a scenario, the subscriber can either go back and refine the main ICP via ICP screen 800 and rerun the search or can use a quicker path by specifying filtering criteria. In one embodiment, the filtering criteria may include the ability to provide exclusionary filtering, for example, under a sub-industries heading. So, the subscriber could exclude the tree trimming company from showing up in future search results by selecting "tree trimming" and "tree maintenance" as excluded sub-industries, thereby eliminating such companies from being included in future search results associated with this ICP.

Figure 8F:
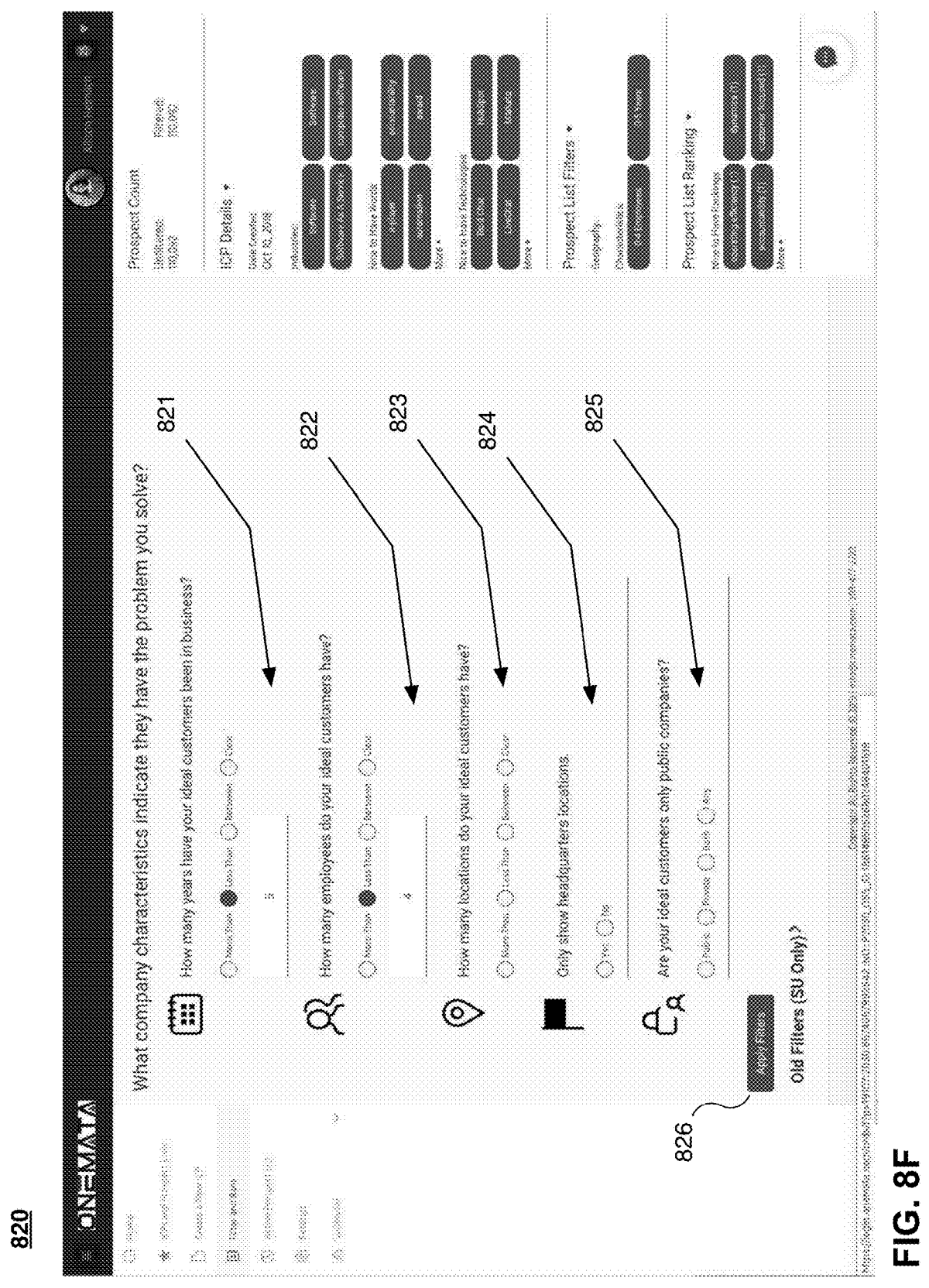

FIG. 8F illustrates a portion of search result filtering screen 820 of a user interface of a SaaS based Internet search engine in accordance with an embodiment of the present invention. The list of company records provided responsive a search conducted based on the ICP may be quite extensive. In order to identify those most relevant to the needs of the subscriber, search result filtering screen 820 provides several ways for the subscriber to further refine the characteristics/attributes of companies to be included in a filtered list of prospects.

In the context of the present example, search result filtering screen 820 includes five sets of radio buttons 821, 822, 823, 824 and 825. Radio buttons 821 allow the subscriber to select a condition relating to a specified number of years or range of years the prospect should be in business to be included in the filtered list of prospects. For example, the subscriber may specify a number or range of years and select one of the following conditions: "more than," "less than," or "between." Alternatively, the subscriber can "clear" this filter.

Similarly, radio buttons 822 allow the subscriber to select a condition relating to a specified number of employees or range of employees the prospect should employ to be included in the filtered list of prospects. For example, the subscriber may specify a number or range of employees and select one of the following conditions: "more than," "less than," or "between." Alternatively, the subscriber can "clear" this filter.

Radio buttons 223 allow the subscriber to select a condition relating to a specified number of locations the ideal prospect should have to be included in the filtered list of prospects. For example, the subscriber may specify a number or range of locations and select one of the following conditions: "more than," "less than," or "between." Alternatively, the subscriber can "clear" this filter.

Radio buttons 224 allow the subscriber to select whether only headquarters locations for companies are to be included in the filtered list of prospects.

Radio buttons 225 allow the subscriber to select conditions relating to the public or private nature of the companies that are to be included in the filtered list of prospects. For example, the subscriber may specify only publicly traded companies are be included in the filtered list of prospects, only privately owned companies are to be included in the filtered list or prospects, both publicly traded companies and privately owned companies are to be included in the filtered list of prospects or "any" type of company, which would presumably include government owned companies, may be included within the filtered list of prospects.

Once the subscriber has specified all the filtering criteria that they desire, the "Apply Filters" button 826 may be selected to locally filter the search results based on the specified filtering criteria. After the subscriber has selected button 826, prospect list screen 810 may be presented to the subscriber with the filtered list of prospects.

Figure 8G:
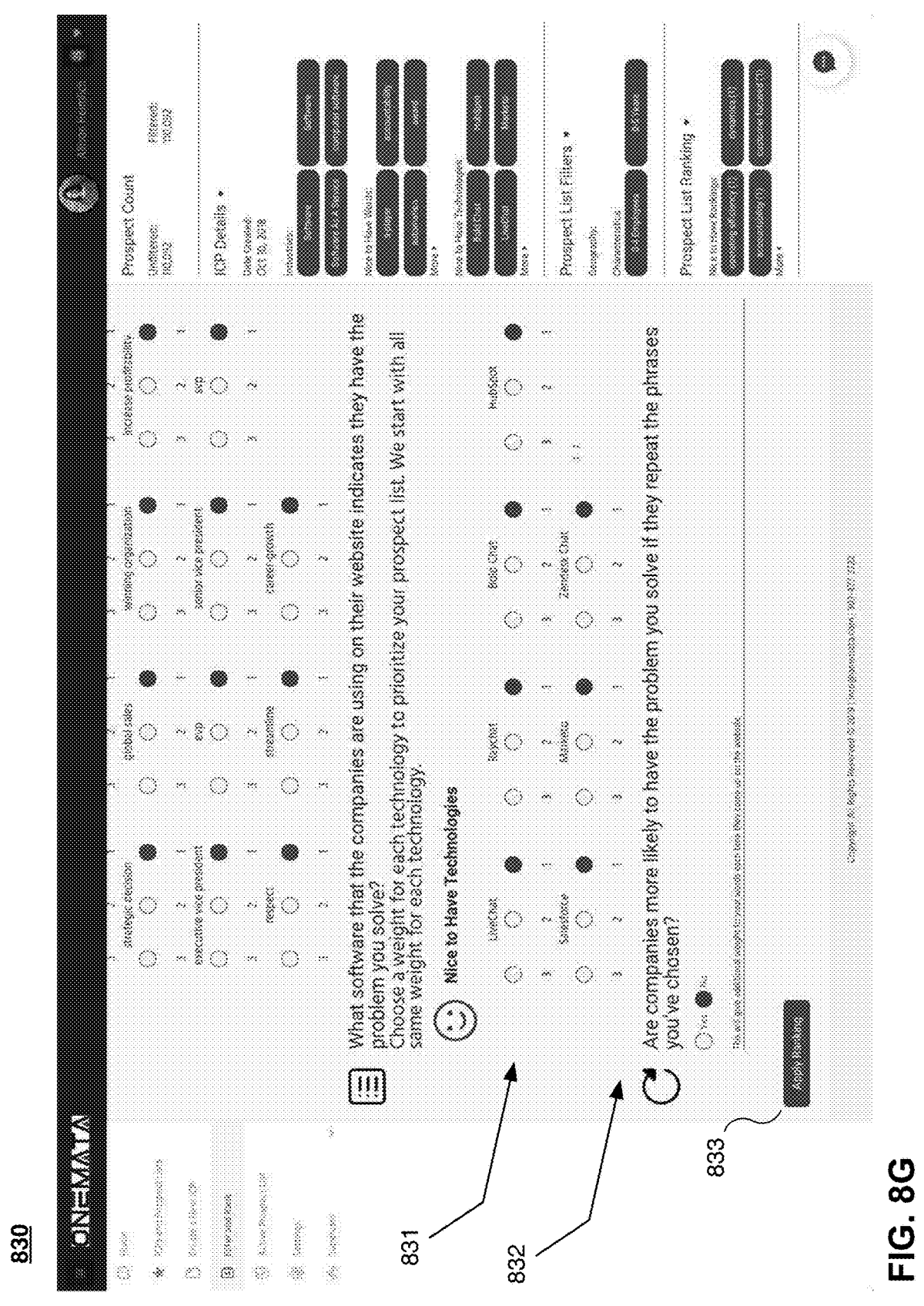

FIG. 8G illustrates a portion of search result ranking screen 830 of a user interface of a SaaS based Internet search engine in accordance with an embodiment of the present invention. As noted above, the list of company records provided responsive a search conducted based on the ICP may be quite extensive, even after user-specified filtering criteria have been applied. In an effort to sort/rank the list of company records in accordance with the priorities of the subscriber, search result ranking screen 830 may provide mechanisms for the subscriber to further specify the relative importance of various characteristics/attributes of companies and/or the search terms/phrases. In the context of the present example, search result ranking screen 830 includes a set of radio buttons for each of multiple technologies 831 (e.g., LiveChat, RayChat, Bold Chat, HubSpot, Salesforce, Marketo, and Zendesk Chat) used by companies that might be evidenced by the source code of their website content. Those skilled in the art will appreciate the specific technologies listed on search result ranking screen 830 are merely exemplary in nature as there are over one thousand web technologies in over sixty categories (e.g., accounting, advertising networks, analytics tools, blogs, cache tools, captchas, content management systems, databases, dev tools, ecommerce platforms, network devices, network storage, operating systems, payment processors, programming languages, server software, video players, web frameworks, web mail, widgets, etc.). Depending upon the need so a particular implementation, various subsets or all of such web technologies might be capable of individual ranking in accordance with embodiments of the present invention.

For each "nice to have technology," the subscriber can select a relative importance from one to three. A ranking score can then be calculated for each company in the list of company records by adding one to three points to their score for each of the technologies found to be used by the company as a result of analyzing the source code of their website content with a web technology profiler tool, for example.

The ranking score can also be influenced as a result of repetition of the user-specified search terms/phrases via radio buttons 832. In one embodiment, as described with reference to FIG. 8H, the subscriber may be provided with the ability to individually rate the importance of ideal terms and phrases.

Once the subscriber has specified all the ranking criteria that they desire, the "Apply Ranking" button 833 may be selected to locally rank the search results based on the specified ranking criteria and corresponding scoring of the web site content of the companies in the list of company records. After the subscriber has selected button 826, prospect list screen 810 may be presented to the subscriber with the ranked list of prospects.

Figure 8H:
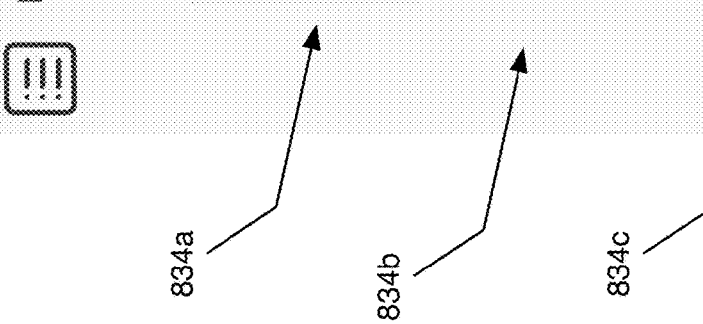
FIG. 8H illustrates a portion of search result ranking screen of a user interface of a SaaS based Internet search engine in accordance with an alternative embodiment of the present invention.

FIG. 8H illustrates a portion of search result ranking screen 830 of a user interface of a SaaS based Internet search engine in accordance with an alternative embodiment of the present invention. In this example, individual ideal terms/phrases 834a-c can be assigned scores in accordance with their perceived importance to the subscriber. For each appearance of such ideal terms/phrases in web content of a company, the company's ranking score can be increased accordingly.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 9:
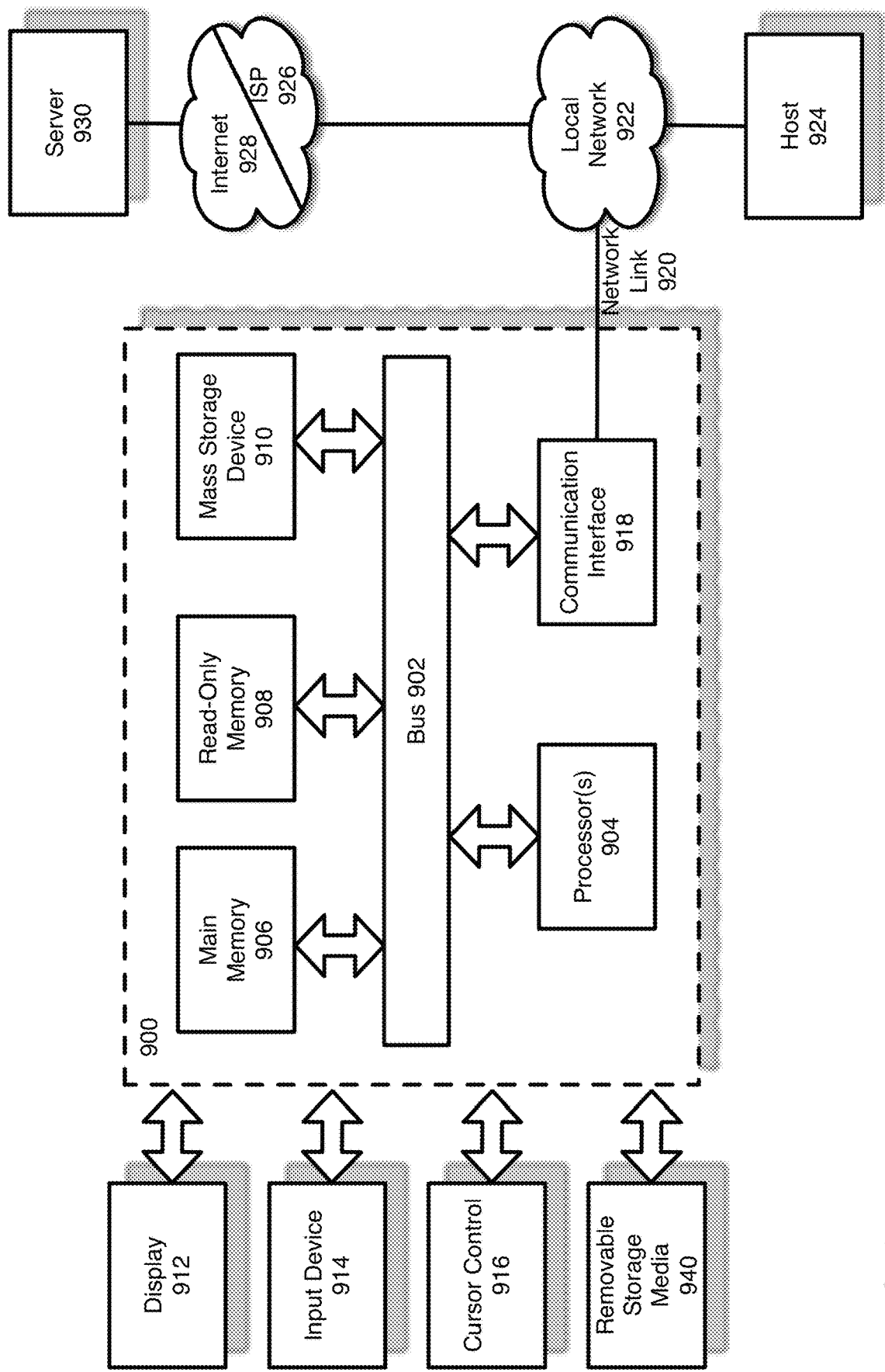
FIG. 9 illustrates an exemplary computer system in which or with which embodiments of the present invention may be utilized.

FIG. 9 is a block diagram that illustrates a computer system 900 upon which an embodiment of the invention may be implemented. Computer system 900 may be representative of all or a portion of the computing resources associated with a web server (e.g., web server(s) 210), a search server (e.g., search server(s) 215), an application server (e.g., application server(s) 220), or end user work stations (e.g., computers 112a-n). Notably, components of computer system 900 described herein are meant only to exemplify various possibilities. In no way should exemplary computer system 900 limit the scope of the present invention. In the context of the present example, computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc—Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other nonvolatile storage for later execution.

While embodiments of the present invention have been illustrated and described, it will be clear that the invention is not limited to these specific embodiments. Numerous modifications, changes, variations, substitutions, and equivalents will be apparent to those skilled in the art, without departing from the spirit and scope of the invention, as described in the claims.

What is claimed is:

1. A method comprising:
   receiving, by one or more processors of one or more physical or virtual servers of a Software as a Service (SaaS) based Internet search engine, a search request from an end user of a subscriber of the SaaS based Internet search engine via a browser based interface displayed on a client device being used by the end user, wherein the search request includes (i) one or more initial constraints specified by the end user that are to be used by the SaaS based Internet search engine to constrain a search of real-time Internet content to be performed responsive to the search request to a domain name space and (ii) one or more user-specified search terms or phrases;
   responsive to receipt of the search request, generating, by the one or more processors, a structured search query containing a finite number of domain names defining the domain name space and one or more search terms or phrases to be applied to the real-time Internet content within the domain name space by:
   identifying company records matching the one or more initial constraints by searching a company database having stored therein characteristics/attributes regarding a plurality of companies; and
   incorporating into the structured search query:
   a plurality of domain names each representing a website domain of a company of those of the plurality of companies associated
   with the identified matching records by extracting the plurality of domain names from the identified matching company records; and
   the one or more user-specified search terms or phrases;
   performing, by the one or more processors, the search of real-time Internet content based on the structured search query by, for each domain name of the plurality of domain names:
   retrieving a predetermined number of web pages associated with the web site domain; and
   when content of the predetermined number of web pages satisfies match criteria associated with one or more user-specified search terms or phrases, adding the content to a set of search results;
   causing, by the one or more processors, information regarding the set of search results, including a list of companies associated with the set of search results, to be locally stored by the SaaS based Internet search engine and presented to the end user via the browser based interface; and
   facilitating, by the one or more processors, one or more of interactive filtering and interactive ranking of the locally stored set of search results based on one or more user-selected desired characteristics of companies in the list of companies or one or more user-selected desired characteristics of the content of the companies.

2. The method of claim 1, wherein a first match criterion of the match criteria associated with the one or more user-specified search terms or phrases identifies a first set of the one or more user-specified search terms or phrases as mandatory terms or phrases that must be present in the content for the match criteria to be satisfied.

3. The method of claim 2, wherein a second match criterion of the match criteria associated with the one or more user-specified search terms or phrases identifies a second set of the one or more user-specified search terms or phrases as ideal terms or phrases that are desired to be present but need not be present in the content for the match criteria be satisfied.

4. The method of claim 3, wherein a third match criterion of the match criteria associated with the one or more user-specified search terms or phrases identifies a third set of the one or more user-specified search terms or phrases as exclusionary terms or phrases that must not be present in the content for the match criteria to be satisfied.

5. The method of claim 3, wherein said interactive ranking of the locally stored set of search results is further based upon a user-assigned relative importance score to the ideal terms or phrases.

6. The method of claim 1, wherein the search of real-time Internet content represents a sample search to provide prompt feedback to the end user regarding a subset of potential outcomes of the search request by further limiting the plurality of domain names to those of the plurality of companies meeting a sampling criterion.

7. The method of claim 6, wherein the sampling criterion comprises the plurality of companies being located within a predefined distance of a user-specified postal code.

8. The method of claim 1, wherein the one or more user-selected desired characteristics of companies in the list of companies relate to a number of years in business, a number of employees, a number of locations, or whether shares are traded publicly.

9. The method of claim 1, wherein the one or more user-selected desired characteristics of the content of the companies relate to evidence of use of one or more web technologies in source code of the content.

10. The method of claim 9, wherein said interactive ranking of the locally stored set of search results is further based upon a user-assigned relative importance score to the one or more web technologies.

11. The method of claim 1, wherein the one or more initial constraints comprises an industry type or industry vertical.

12. The method of claim 1, wherein the company database is hosted by a third party and accessed by the SaaS based Internet search engine via a web services interface or a Representational State (REST)ful application programming interface (API).

13. A non-transitory computer-readable storage medium embodying a set of instructions, which when executed by one or more processors of one or more physical or virtual servers of a Software as a Service (SaaS) based Internet search engine, causes the one or more processors to perform a method comprising:
  receiving a search request from an end user of a subscriber of the SaaS based Internet search engine via a browser based interface displayed on a client device being used by the end user, wherein the search request includes (i) one or more initial constraints specified by the end user that are to be used by the SaaS based Internet search engine to constrain a search of real-time Internet content to be performed responsive to the search request to a domain name space and (ii) one or more user-specified search terms or phrases;
  responsive to receipt of the search request, generating a structured search query containing a finite number of domain names defining the domain name space and one or more search terms or phrases to be applied to the real-time Internet content within the domain name space by:
    identifying company records matching the one or more initial constraints by searching a company database having stored therein characteristics/attributes regarding a plurality of companies; and
    incorporating into the structured search query:
      a plurality of domain names each representing a website domain of a company of those of the plurality of companies associated with the identified matching records by extracting the plurality of domain names from the identified matching company records; and
      the one or more user-specified search terms or phrases;
  performing the search of real-time Internet content based on the structured search query by, for each domain name of the plurality of domain names:
    retrieving a predetermined number of web pages associated with the web site domain; and
    when content of the predetermined number of web pages satisfies match criteria associated with one or more user-specified search terms or phrases, adding the content to a set of search results;
  causing information regarding the set of search results, including a list of companies associated with the set of search results, to be locally stored by the SaaS based Internet search engine and presented to the end user via the browser based interface; and
  facilitating, by the one or more processors, one or more of interactive filtering and interactive ranking of the locally stored set of search results based on one or more user-selected desired characteristics of companies in the list of companies or one or more user-selected desired characteristics of the content of the companies.

14. The non-transitory computer-readable storage medium of claim 13, wherein a first match criterion of the match criteria associated with the one or more user-specified search terms or phrases identifies a first set of the one or more user-specified search terms or phrases as mandatory terms or phrases that must be present in the content for the match criteria to be satisfied.

15. The non-transitory computer-readable storage medium of claim 14, wherein a second match criterion of the match criteria associated with the one or more user-specified search terms or phrases identifies a second set of the one or more user-specified search terms or phrases as ideal terms or phrases that are desired to be present but need not be present in the content for the match criteria to be satisfied.

16. The non-transitory computer-readable storage medium of claim 15, wherein a third match criterion of the match criteria associated with the one or more user-specified search terms or phrases identifies a third set of the one or more user-specified search terms or phrases as exclusionary terms or phrases that must not be present in the content for the match criteria to be satisfied.

17. The non-transitory computer-readable storage medium of claim 15, wherein said interactive ranking of the locally stored set of search results is further based upon a user-assigned relative importance score to the ideal terms or phrases.

18. The non-transitory computer-readable storage medium of claim 13, wherein the search of real-time Internet content represents a sample search to provide prompt feedback to the end user regarding a subset of potential outcomes of the search request by further limiting the plurality of domain names to those of the plurality of companies meeting a sampling criterion.

19. The non-transitory computer-readable storage medium of claim 18, wherein the sampling criterion comprises the plurality of companies being located within a predefined distance of a user-specified postal code.

20. The non-transitory computer-readable storage medium of claim 13, wherein the one or more user-selected desired characteristics of companies in the list of companies relate to a number of years in business, a number of employees, a number of locations, or whether shares are traded publicly.

21. The non-transitory computer-readable storage medium of claim 13, wherein the one or more user-selected desired characteristics of the content of the companies relate to evidence of use of one or more web technologies in source code of the content.

22. The non-transitory computer-readable storage medium of claim 21, wherein said interactive ranking of the locally stored set of search results is further based upon a user-assigned relative importance score to the one or more web technologies.

23. The non-transitory computer-readable storage medium of claim 13, wherein the one or more initial constraints comprises an industry type or industry vertical.

24. The non-transitory computer-readable storage medium of claim 13, wherein the company database is hosted by a third party and accessed by the SaaS based Internet search engine via a web services interface or a Representational State (REST)ful application programming interface (API).

\* \* \* \* \*